US011869519B2

(12) United States Patent
Adami et al.

(10) Patent No.: US 11,869,519 B2
(45) Date of Patent: *Jan. 9, 2024

(54) APPARATUS AND METHOD FOR DECOMPOSING AN AUDIO SIGNAL USING A VARIABLE THRESHOLD

(71) Applicant: Fraunhofer-Gesellschaft zur Förderung der angewandten Forschung e.V., Munich (DE)

(72) Inventors: Alexander Adami, Gundelsheim (DE); Jürgen Herre, Erlangen (DE); Sascha Disch, Fürth (DE); Florin Ghido, Nuremberg (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 139 days.

This patent is subject to a terminal disclaimer.

(21) Appl. No.: 17/340,981

(22) Filed: Jun. 7, 2021

(65) Prior Publication Data

US 2021/0295854 A1 Sep. 23, 2021

Related U.S. Application Data

(63) Continuation of application No. 16/415,490, filed on May 17, 2019, now Pat. No. 11,158,330, which is a (Continued)

(30) Foreign Application Priority Data

Oct. 12, 2017 (EP) .................................... 17196255

(51) Int. Cl.
*G10L 19/022* (2013.01)
*G10L 19/008* (2013.01)
(Continued)

(52) U.S. Cl.
CPC .......... *G10L 19/022* (2013.01); *G10L 19/008* (2013.01); *G10L 21/028* (2013.01);
(Continued)

(58) Field of Classification Search
CPC ......... G10H 2210/46; G10H 2210/051; G10H 2250/035; G10H 2250/051;
(Continued)

(56) References Cited

U.S. PATENT DOCUMENTS 5,012,519 A 4/1991 Adlersberg et al.
6,640,145 B2 10/2003 Hoffberg et al.
(Continued)

FOREIGN PATENT DOCUMENTS

CA 2952157 A1 2/2016
CN 102089758 A 6/2011
(Continued)

OTHER PUBLICATIONS

Jessica Beltran, et al.: Scalable identification of mixed environmental sounds,recorded from heterogeneous sources.
(Continued)

*Primary Examiner* — Gerald Gauthier
(74) *Attorney, Agent, or Firm* — NKL Law; Jae Youn Kim

(57) ABSTRACT

An apparatus for decomposing an audio signal into a background component signal and a foreground component signal, has: a block generator for generating a time sequence of blocks of audio signal values; an audio signal analyzer for determining a characteristic of a current block of the audio signal and for determining a variability of the characteristic within a group of blocks having at least two blocks of the sequence of blocks; and a separator for separating the current block into a background portion and a foreground portion wherein the separator is configured to determine a
(Continued)

separation threshold based on the variability and to separate the current block into the background component signal and the foreground component signal, when the characteristic of the current block is in a predetermined relation to the separation threshold.

6 Claims, 13 Drawing Sheets

Related U.S. Application Data continuation of application No. PCT/EP2017/079520, filed on Nov. 16, 2017.

(51) Int. Cl.
*G10L 21/0232* (2013.01)
*G10L 21/028* (2013.01)
*H04S 3/00* (2006.01)
*G10L 21/0272* (2013.01)
*G10L 21/0208* (2013.01)
*H04S 1/00* (2006.01)

(52) U.S. Cl.
CPC ...... *G10L 21/0232* (2013.01); *G10L 21/0272* (2013.01); *H04S 3/008* (2013.01); *G10H 2210/046* (2013.01); *G10H 2210/051* (2013.01); *G10H 2250/035* (2013.01); *G10H 2250/235* (2013.01); *G10L 21/0208* (2013.01); *H04S 1/007* (2013.01); *H04S 2400/01* (2013.01)

(58) Field of Classification Search
CPC . G10H 2250/235; G10L 15/22; G10L 19/008; G10L 19/0216; G10L 19/022; G10L 21/0208; G10L 21/0232; G10L 21/0272; G10L 21/028; G10L 25/78; G10L 25/84; G10L 15/30; G10L 21/0356; G10L 25/21; H04R 3/005; H04R 5/04; H04R 3/04; H04S 1/007; H04S 3/008; H04S 2400/01; G08G 1/0965
See application file for complete search history.

(56) References Cited

U.S. PATENT DOCUMENTS 6,799,170 B2 9/2004 Lee et al.
7,006,881 B1 2/2006 Hoffberg et al.
7,283,954 B2 10/2007 Crockett et al.
7,295,972 B2 11/2007 Choi
7,454,329 B2 11/2008 Nishiguchi
7,567,845 B1 7/2009 Avendano et al.
7,903,751 B2 3/2011 Fiesel et al.
7,930,170 B2 4/2011 Chakravarthy et al.
7,962,332 B2 6/2011 Liebchen
8,046,234 B2 10/2011 Kim et al.
8,073,148 B2* 12/2011 Kim .................... G10L 21/0208 704/226
8,155,971 B2 4/2012 Falch et al.
8,224,658 B2 7/2012 Kim et al.
8,239,052 B2 8/2012 Goto et al.
8,359,205 B2 1/2013 Srinivasan et al.
8,379,868 B2 2/2013 Goodwin et al.
8,725,503 B2 5/2014 Bessette
8,805,679 B2 8/2014 You
8,812,322 B2 8/2014 Mysore et al.
8,958,566 B2 2/2015 Falch et al.
9,338,420 B2 5/2016 Xiang
9,495,969 B2* 11/2016 Rodriguez .............. G10L 15/30
9,633,665 B2* 4/2017 Hennequin ........... G10L 21/028
10,176,826 B2 1/2019 Wang
10,504,539 B2 12/2019 Kaskari et al.
11,158,330 B2* 10/2021 Adami ................ G10L 21/0232
11,183,199 B2* 11/2021 Adami .................. G10L 19/008
2002/0163533 A1 11/2002 Li et al.
2003/0112265 A1 6/2003 Zhang
2004/0005065 A1 1/2004 Griesinger
2005/0065792 A1 3/2005 Gao
2006/0241938 A1 10/2006 Hetherington et al.
2007/0021958 A1* 1/2007 Visser ..................... G10L 25/78 704/226
2007/0174050 A1 7/2007 Escott et al.
2007/0177620 A1 8/2007 Hiwasaki et al.
2008/0089531 A1* 4/2008 Koga ..................... H04R 3/005 704/E21.012
2008/0175394 A1* 7/2008 Goodwin ................ H04S 3/008 381/1
2009/0080666 A1* 3/2009 Uhle ........................ H04R 5/04 381/17
2009/0168984 A1 7/2009 Kreiner et al.
2009/0252341 A1 10/2009 Goodwin
2009/0254338 A1 10/2009 Chan et al.
2009/0281805 A1 11/2009 Chen et al.
2010/0017206 A1* 1/2010 Kim .................... G10L 21/0272 704/E15.039
2010/0125352 A1 5/2010 Kondo et al.
2010/0128897 A1* 5/2010 Saruwatari ............ G10L 21/028 381/94.3
2010/0138010 A1 6/2010 Aziz Sbai et al.
2010/0174389 A1 7/2010 Aziz Sbai et al.
2011/0026813 A1 2/2011 Carlin et al.
2011/0075832 A1 3/2011 Tashiro
2011/0091043 A1 4/2011 Wang
2011/0099010 A1 4/2011 Zhang
2011/0282658 A1 11/2011 Quatieri, Jr. et al.
2011/0301948 A1 12/2011 Chen
2012/0045066 A1 2/2012 Nakadai et al.
2012/0114126 A1 5/2012 Del Galdo et al.
2012/0275613 A1 11/2012 Soulodre
2013/0018660 A1 1/2013 Qi et al.
2013/0121506 A1* 5/2013 Mysore ................. G10L 21/028 381/94.1
2013/0142343 A1* 6/2013 Matsui .................. G10L 21/028 381/71.1
2014/0236582 A1 8/2014 Beltman et al.
2014/0278391 A1* 9/2014 Braho ..................... G10L 25/78 704/233
2014/0355766 A1 12/2014 Morrell et al.
2014/0358265 A1 12/2014 Wang et al.
2015/0066499 A1 3/2015 Wang et al.
2015/0127354 A1 5/2015 Peters et al.
2015/0149183 A1 5/2015 Hennequin
2015/0213803 A1 7/2015 Peters et al.
2015/0221322 A1* 8/2015 Iyengar ................... G10L 25/84 704/226
2015/0243292 A1 8/2015 Morrell et al.
2015/0281839 A1* 10/2015 Bar-On ............... G10L 21/0272 381/71.7
2016/0086609 A1 3/2016 Chen et al.
2016/0140981 A1 5/2016 Niedermeir et al.
2016/0180861 A1* 6/2016 Masuda .............. G10L 21/0356 704/225
2016/0189731 A1 6/2016 Hennequin
2016/0307554 A1 10/2016 Chiou et al.
2016/0307581 A1 10/2016 Salmela et al.
2017/0040030 A1* 2/2017 Nakamura .............. G10L 25/78
2017/0061978 A1* 3/2017 Wang .................. G10L 21/0232
2017/0061981 A1* 3/2017 Nakadai .................. G10L 25/84
2017/0098310 A1 4/2017 Chefd'Hotel et al.
2017/0133034 A1 5/2017 Gampp et al.
2017/0178664 A1 6/2017 Donnelly et al.
2017/0194008 A1 7/2017 Haddad et al.
2017/0243577 A1* 8/2017 Wingate .................. G10L 15/22
2017/0278519 A1 9/2017 Guo et al.
2017/0280235 A1* 9/2017 Varerkar .................. H04R 3/04
2018/0012614 A1* 1/2018 Soleymani .......... G10L 19/0216
2018/0018976 A1* 1/2018 Su ........................... H04S 1/007
2018/0033444 A1 2/2018 Baeckstroem et al.
2018/0033447 A1* 2/2018 Ramprashad ........... G10L 25/21
2018/0068670 A1 3/2018 Lu et al.

(56) References Cited

U.S. PATENT DOCUMENTS

| | | | | |
|---|---|---|---|---|
| 2018/0204580 | A1 | 7/2018 | Bäckström et al. | |
| 2019/0013036 | A1 | 1/2019 | Buck et al. | |
| 2019/0027032 | A1* | 1/2019 | Arunachalam | G08G 1/0965 |
| 2019/0272835 | A1* | 9/2019 | Adami | G10L 21/028 |
| 2019/0272836 | A1* | 9/2019 | Adami | G10L 21/0232 |
| 2021/0295854 | A1* | 9/2021 | Adami | G10L 21/0232 |

FOREIGN PATENT DOCUMENTS

| | | | |
|---|---|---|---|
| CN | 103402169 | A | 11/2013 |
| CN | 105518776 | A | 4/2016 |
| EP | 1855272 | A1 | 11/2007 |
| EP | 2154911 | A1 | 2/2010 |
| EP | 2866228 | A1 | 4/2015 |
| JP | 2000-250568 | A | 9/2000 |
| JP | 2008-015481 | A | 1/2008 |
| JP | 2011-075728 | A | 4/2011 |
| JP | 2014-115377 | A | 6/2014 |
| KR | 10-1456640 | B1 | 11/2014 |
| RU | 2589298 | C1 | 7/2016 |
| WO | 02/47068 | A2 | 6/2002 |
| WO | 0247068 | A2 | 6/2002 |
| WO | 2009/028937 | A1 | 3/2009 |
| WO | 2009/051132 | A1 | 4/2009 |
| WO | 2010003491 | A1 | 1/2010 |
| WO | 2010/017967 | A1 | 2/2010 |
| WO | 2011/049515 | A1 | 10/2010 |
| WO | 2011/111091 | A1 | 9/2011 |
| WO | 2014020182 | A2 | 2/2014 |
| WO | 2015175933 | A1 | 11/2015 |
| WO | 2015175998 | A1 | 11/2015 |
| WO | 2016/133785 | A1 | 2/2016 |

OTHER PUBLICATIONS

Yun Xiao-hua, Jing Xin-xing: Speech Signal Separation Under Background Noise, College of Information & Communication, Guilin University of Electronic Technology, Guilin 541004, China.
K. Sakhnov et al., "Approach for Energy-Based Voice Detector with Adaptive Scaling Factor", IAENG International Journal of Computer Science, Nov. 1, 2009, pp. 394-399, XP055216468.
Stefanie Ebbinghaus et al., "Office Communication for EP Application No. 17798236.0", dated Feb. 18, 2021 , EPO, Europe.
Sung-Yoon Jung, Office Action for KR Application No. 10-2019-7017323 dated Nov. 11, 2020, KIPO, Korea.
Adami, A., et al. "Perception and Measurement of Applause Characteristics" Proc. 29th Tonmeistertagung, Nov. 2016, pp. 199-206, International Audio Laboratories Erlangen, Germany.
Goodwin, M.M., et al. "Frequency-Domain Algorithms for Audio Signal Enhancement Based on Transient Modification" J., 2006, vol. 54, No. 9, pp. 827-840, Audio Eng. Soc, Scotts Valley, USA.
Walther, A., et al. "Using Transient Suppression in Blind Multichannel Upmix Algorithms" 122nd AES Pro Audio Expo and Convention, May 2007, Paper 6990, Audio Engineering Society, Vienna, Austria.
Disch, S., et al. "A Dedicated Decorrelator for Parametric Spatial Coding of Applause-Like Audio Signals" Springer-Verlag, Jan. 2012, pp. 355-363, Fraunhofer IIS, Erlangen, Germany.
Kuntz, A., et al. "The Transient Steering Decorrelator Tool in the Upcoming MPEG Unified Speech and Audio Coding Standard" 131st AES Convention, Oct. 2011, Paper 8533, Audio Engineering Society, New York, USA.
Hotho, G., et al. "Multichannel Coding of Applause Signals" Eurasip J. Adv. Signal Process., vol. 2008, Article ID 531693, http://dx.doi.org/10.1155/2008/534693, Jul. 26, 2007, Digital Signal Processing Group, Philips Research, High Tech Campus 36, 5656 AE Eindhoven, The Netherlands.
Fitzgerald, D. "Harmonic/Percussive Separation Using Median Filtering" Proc. 13th Int. Conference on Digital Audio Effects (DAFx-10), Sep. 2010, Graz, Austria.
Bello, J.P., et al. "A Tutorial on Onset Detection in Music Signals" IEEE Trans. Speech Audio Process., 2005, vol. 13, No. 5, pp. 1035-1047.
Goto, M., et al. "Beat tracking based on multiple-agent architecture—a real-time beat tracking system for audio signals" Proceeding of the 2nd Int. Conference on Multi-Agent Systems, 1996, pp. 103-110, Tokyo, Japan.
Klapuri, A. "Sound onset detection by applying psychoacoustic knowledge" Proc. IEEE ICASSP, 1999, vol. 6, pp. 3089-3092, Signal Processing Laboratory, Tampere University of Technology, Tampere, Finland.
Liu Liu, "Research on Audio Scene Recognition Based on Sparse Decomposition", Full-text Database of Excellent Master's Dissertations in China, Issue 3, Mar. 15, 2014.
Jian Wang, "A Novel Audio Watermarking Algorithm Based on Reduced Singular Value Decomposition", 2010 Sixth International Conference on Intelligent Information Hiding and Multimedia Signal Processing, Nov. 15, 2010.

* cited by examiner black generator 110

$$A(k, n) = C(k, n) + N(k, n) \quad (1)$$

audio signal analyzer 120

$$\Phi_X(n) = \|X(k, n)\| \quad (1A)$$

$$\bar{\Phi}_A(n) = \frac{\sum_{m=-M}^{M} \Phi_A(n-m) \cdot w(m+M)}{\sum_{m=-M}^{M} w(m+M)}, \quad (2)$$

(for fixed threshold, variable threshold/ no threshold $$v'(n) = \mathrm{var}([\Phi_A(n-M), \Phi_A(n-M+1), \ldots, \Phi_A(n+m)]), \quad m = -M \ldots M, \quad (6)$$

(for variable threshold)

separator 130

$$\bar{\Psi}(n) = \frac{\Phi_A(n)}{\bar{\Phi}_A(n)}. \quad (3)$$

$$g_s(n) = \max\left(1 - \sqrt{\frac{g_N}{\Psi_{(n)}}}, 0\right) \quad (3A)$$

(no threshold)

$$g_s(n) = \begin{cases} \max\left(1 - \sqrt{\frac{g_N}{\Psi_{(n)}}}, 0\right) & \text{if } \Psi(n) \geq \tau_{attack}, \\ 0, & \text{else.} \end{cases} \quad (4)$$

(single threshold)

$$g_s(n) = \begin{cases} \max\left(1 - \sqrt{\frac{g_N}{\Psi_{(n)}}}, 0\right) & \text{if } \Psi(n) \geq \tau_{attack}, \\ g_s(n-1) & \text{if } \tau_{attack} > \Psi(n) > \tau_{release}, \\ 0, & \text{if } \Psi(n) \leq \tau_{release}, \end{cases} \quad (5)$$

(double threshold)

$$v(n) = h_{TP}(n) \star v'(n), \quad (7)$$

$$\tau_{attack}(n) = f_{attack}(v(n)), \quad (8)$$

$$\tau_{release}(n) = f_{release}(v(n)), \quad (9)$$

(double adaptive threshold)

foreground $C(k, n) = g_s(n) \cdot A(k, n)$ (10)

background $N(k, n) = A(k, n) - C(k, n)$ (11)

Fig. 1f $$C(k,n) = A(k,n) \cdot [1 - f(\frac{g_N}{\Psi_{(n)}})]$$

or $$N(k,n) = A(k,n) \cdot f(\frac{g_N}{\Psi_{(n)}})$$

$N = A - C$; $C = A - N$;

Linear functions, where the solid line represents the mapping for the attack thresholds ($\tau_{attack} = \{1.4, 2.9\}$) and the dashed line represents the mapping for the release thresholds ($\tau_{release} = \{1.3, 1.0\}$).

Exemple for a cubic mapping function.

APPARATUS AND METHOD FOR DECOMPOSING AN AUDIO SIGNAL USING A VARIABLE THRESHOLD

CROSS-REFERENCE TO RELATED APPLICATIONS

This application is a continuation of a copending U.S. application Ser. No. 16/415,490, filed May 17, 2019, which is a continuation of International Application No. PCT/EP2017/079520, filed Nov. 16, 2017, which is incorporated herein by reference in its entirety, and additionally claims priority from European Application No. 16199405.8, filed Nov. 17, 2016, which is also incorporated herein by reference in its entirety.

BACKGROUND OF THE INVENTION

The present invention is related to audio processing and, in particular, to the decomposition of audio signals into a background component signal and a foreground component signal.

A significant amount of references directed to audio signal processing exist, in which some of these references are related to audio signal decomposition. Exemplary references are:

[1] S. Disch and A. Kuntz, *A Dedicated Decorrelator for Parametric Spatial Coding of Applause-Like Audio Signals*. Springer-Verlag, January 2012, pp. 355-363.

[2] A. Kuntz, S. Disch, T. Bäckström, and J. Robilliard, "The Transient Steering Decorrelator Tool in the Upcoming MPEG Unified Speech and Audio Coding Standard," in 131st *Convention of the AES*, New York, USA, 2011.

[3] A. Walther, C. Uhle, and S. Disch, "Using Transient Suppression in Blind Multi-channel Upmix Algorithms," in *Proceedings, 122nd AES Pro Audio Expo and Convention*, May 2007.

[4] G. Hotho, S. van de Par, and J. Breebaart, "Multichannel coding of applause signals", EURASIP J. Adv. Signal Process, vol. 2008, January 2008. [Online]. Available: http://dx.doi.org/10.1155/2008/531693

[5] D. FitzGerald, "Harmonic/Percussive Separation Using Median Filtering," in *Proceedings of the 13th International Conference on Digital Audio Effects (DAFx-10)*, Graz, Austria, 2010.

[6] J. P. Bello, L. Daudet, S. Abdallah, C. Duxbury, M. Davies, and M. B. Sandler, "A Tutorial on Onset Detection in Music Signals," *IEEE Transactions on Speech and Audio Processing*, vol. 13, no. 5, pp. 1035-1047, 2005.

[7] M. Goto and Y. Muraoka, "Beat tracking based on multiple-agent architecture—a real-time beat tracking system for audio signals," in *Proceedings of the 2nd International Conference on Multiagent Systems,* 1996, pp. 103-110.

[8] A. Klapuri, "Sound onset detection by applying psychoacoustic knowledge," in *Proceedings of the International Conference on Acoustics, Speech, and Signal Processing (ICASSP)*, vol. 6, 1999, pp. 3089-3092 vol. 6.

Furthermore, WO 2010017967 discloses an apparatus for determining a spatial output multichannel audio signal based on an input audio signal comprising a semantic decomposer for decomposing the input audio signal into a first decomposed signal being a foreground signal part and into a second decomposed signal being a background signal part. Furthermore, a renderer is configured for rendering the foreground signal part using amplitude panning and for rendering the background signal part by decorrelation. Finally, the first rendered signal and the second rendered signal are processed to obtain a spatial output multi-channel audio signal.

Furthermore, references [1] and [2] disclose a transient steering decorrelator.

The not yet published European application 16156200.4 discloses a high resolution envelope processing. The high resolution envelope processing is a tool for improved coding of signals that predominantly consist of many dense transient events such as applause, raindrop sounds, etc. At an encoder side, the tool works as a preprocessor with high temporal resolution before the actual perceptual audio codec by analyzing the input signal, attenuating and, thus, temporally flattening the high frequency part of transient events and generating a small amount of side information such as 1 to 4 kbps for stereo signals. At the decoder side, the tool works as a postprocessor after the audio codec by boosting and, thus, temporally shaping the high frequency part of transient events, making use of the side information that was generated during encoding.

Upmixing usually involves a signal decomposition into direct and ambient signal parts where the direct signal is panned between loudspeakers and the ambient part is decorrelated and distributed across the given number of channels. Remaining direct components, like transients, within the ambient signals lead to an impairment of the resulting perceived ambience in the upmixed sound scene. In [3] a transient detection and processing is proposed which reduces detected transients within the ambient signal. One method proposed for transient detection comprises a comparison between a frequency weighted sum of bins in one time block and a weighted long time running mean for deciding whether a certain block is to be suppressed or not.

In [4], efficient spatial audio coding of applause signals is addressed. The proposed downmix- and upmix methods all work for a full applause signal.

Furthermore, reference [5] discloses a harmonic/percussive separation where signals are separated in harmonic and percussive signal components by applying median filters to the spectrogram in horizontal and vertical direction.

Reference [6] represents a tutorial comprising frequency domain approaches, time domain approaches such as an envelope follower or an energy follower in the context of onset detection. Reference [7] discloses power tracking in the frequency domain such as a rapid increase of power and reference [8] discloses a novelty measure for the purpose of onset detection.

The separation of a signal into a foreground and a background signal part as described in known references is disadvantageous due to the fact that such known procedures may result in a reduced audio quality of a result signal or of decomposed signals.

SUMMARY

According to an embodiment, an apparatus for decomposing an audio signal into a background component signal and a foreground component signal may have: a block generator for generating a time sequence of blocks of audio signal values; an audio signal analyzer for determining a characteristic of a current block of the audio signal and for determining a variability of the characteristic within a group of blocks having at least two blocks of the sequence of blocks; and a separator for separating the current block into a background portion and a foreground portion, wherein the separator is configured to determine a separation threshold based on the variability and to separate the current block into the background component signal and the foreground component signal, when the characteristic of the current block is in a predetermined relation to the separation threshold, or to determine the whole current block as a foreground component signal, when the characteristic of the current block is in the predetermined relation to the separation threshold, or to determine the whole current block as a background component signal, when the characteristic of the current block is not in the predetermined relation to the separation threshold.

According to another embodiment, a method of decomposing an audio signal into a background component signal and a foreground component signal may have the steps of: generating a time sequence of blocks of audio signal values; determining a characteristic of a current block of the audio signal and determining a variability of the characteristic within a group of blocks having at least two blocks of the sequence of blocks; and separating the current block into a background portion and a foreground portion, wherein a separation threshold is determined based on the variability and wherein the current block is separated into the background component signal and the foreground component signal, when the characteristic of the current block is in a predetermined relation to the separation threshold, or wherein the whole current block is determined as a foreground component signal, when the characteristic of the current block is in the predetermined relation to the separation threshold, or wherein determine the whole current block is determined as a background component signal, when the characteristic of the current block is not in the predetermined relation to the separation threshold.

Another embodiment may have a non-transitory digital storage medium having stored thereon a computer program for performing a method of decomposing an audio signal into a background component signal and a foreground component signal, the method having the steps of: generating a time sequence of blocks of audio signal values; determining a characteristic of a current block of the audio signal and determining a variability of the characteristic within a group of blocks having at least two blocks of the sequence of blocks; and separating the current block into a background portion and a foreground portion, wherein a separation threshold is determined based on the variability and wherein the current block is separated into the background component signal and the foreground component signal, when the characteristic of the current block is in a predetermined relation to the separation threshold, or wherein the whole current block is determined as a foreground component signal, when the characteristic of the current block is in the predetermined relation to the separation threshold, or wherein determine the whole current block is determined as a background component signal, when the characteristic of the current block is not in the predetermined relation to the separation threshold, when said computer program is run by a computer.

In one aspect, an apparatus for decomposing an audio signal into a background component signal and a foreground component signal comprises a block generator for generating a time sequence of blocks of audio signal values, an audio signal analyzer connected to the block generator and a separator connected to the block generator and the audio signal analyzer. In accordance with a first aspect, the audio signal analyzer is configured for determining a block characteristic of a current block of the audio signal and an average characteristic for a group of blocks, the group of blocks comprising at least two blocks such as a preceding block, the current block and a following block or even more preceding blocks or more following blocks.

The separator is configured for separating the current block into a background portion and a foreground portion in response to a ratio of the block characteristic of the current block and the average characteristic. Thus, the background component signal comprises the background portion of the current block and the foreground component signal comprises the foreground portion of the current block. Therefore, the current block is not simply decided as being either background or foreground. Instead, the current block is actually separated into a non-zero background portion and a non-zero foreground portion. This procedure reflects the situation that, typically, a foreground signal never exists alone in a signal but is combined to a background signal component. Thus, the present invention, in accordance with this first aspect, reflects the situation that irrespective of whether a certain thresholding is performed or not, the actual separation either without any threshold or when a certain threshold is reached by the ratio, a background portion in addition to the foreground portion remains.

Furthermore, the separation is done by a very specific separation measure, i.e., the ratio of a block characteristic of the current block and the average characteristic derived from at least two blocks, i.e., derived from the group of blocks. Thus, depending on the size of the group of blocks, a quite slowly changing moving average or a quite rapidly changing moving average can be set. For a high number of blocks in the group of blocks, the moving average is relatively slowly changing while, for a small number of blocks in the group of blocks, the moving average is quite rapidly changing. Furthermore, the usage of a relation between a characteristic from the current block and an average characteristic over the group of blocks reflects a perceptual situation, i.e., that individuals perceive a certain block as comprising a foreground component when a ratio between a characteristic of this block with respect to an average is at a certain value. In accordance with this aspect, however, this certain value does not necessarily have to be a threshold. Instead, the ratio itself can already be used for performing a quantitative separation of the current block into a background portion and a foreground portion. A high ratio results in a high portion of the current block being a foreground portion while a low ratio results in the situation that most or all of the current block remains in the background portion and the current block only has a small foreground portion or does not have any foreground portion at all.

Advantageously, an amplitude-related characteristic is determined and this amplitude-related characteristic such as an energy of the current block is compared to an average energy of the group of blocks to obtain the ratio, based on which the separation is performed. In order to make sure that in response to a separation a background signal remains, a gain factor is determined and this gain factor then controls how much of the average energy of a certain block remains within the background or noise-like signal and which portion goes into the foreground signal portion that can, for example, be a transient signal such as a clap signal or a raindrop signal or the like. In a further second aspect of the present invention that can be used in addition to the first aspect or separate from the first aspect, the apparatus for decomposing the audio signal comprises a block generator, an audio signal analyzer and a separator. The audio signal analyzer is configured for analyzing the characteristic of the current block of the audio signal. The characteristic of the current block of the audio signal can be the ratio as discussed with respect to the first aspect but, alternatively, can also be a block characteristic only derived from the current block without any averaging. Furthermore, the audio signal analyzer is configured for determining a variability of the characteristic within a group of blocks, where the group of blocks comprises at least two blocks and advantageously at least two preceding blocks with or without the current block or at least two following blocks with or without the current block or both at least two preceding blocks, at least two following blocks, again with or without the current block. In embodiments, the number of blocks is greater than 30 or even 40.

Furthermore, the separator is configured for separating the current block into the background portion and the foreground portion, wherein this separator is configured to determine a separation threshold based on the variability determined by the signal analyzer and to separate the current block when the characteristic of the current block is in a predetermined relation to the separation threshold such as greater than or equal to the separation threshold. Naturally, when the threshold is defined to be a kind of inverse value then the predetermined relation can be a smaller than relation or a smaller than or equal relation. Thus, thresholding is performed in such a way that when the characteristic is within a predetermined relation to the separation threshold then the separation into the background portion and the foreground portion is performed while, when the characteristic is not within the predetermined relation to the separation threshold then a separation is not performed at all.

In accordance with the second aspect that uses the variable threshold depending on the variability of the characteristic within the group of blocks, the separation can be a full separation, i.e., that the whole block of audio signal values is introduced into the foreground component when a separation is performed or the whole block of audio signal values resembles a background signal portion when the predetermined relation with respect to the variable separation threshold is not fulfilled. In an embodiment, this aspect is combined with the first aspect in that as soon as the variable threshold is found to be in a predetermined relation to the characteristic then a non-binary separation is performed, i.e., that only a portion of the audio signal values is put into the foreground signal portion and a remaining portion is left in the background signal.

Advantageously, the separation of the portion for the foreground signal portion and the background signal portion is determined based on a gain factor, i.e., the same signal values are, in the end, within the foreground signal portion and the background signal portion but the energy of the signal values within the different portions is different from each other and is determined by a separation gain that, in the end, depends on the characteristic such as the block characteristic of the current block itself or the ratio for the current block between the block characteristic for the current block and an average characteristic for the group of blocks associated with the current block.

The usage of a variable threshold reflects the situation that individuals perceive a foreground signal portion even as a small deviation from a quite stationary signal, i.e., when a certain signal is considered that is very stationary, i.e., does not have significant fluctuations. Then even a small fluctuation is already perceived to be a foreground signal portion. However, when there is a strongly fluctuating signal then it appears that the strongly fluctuating signal itself is perceived to be the background signal component and a small deviation from this pattern of fluctuations is not perceived to be a foreground signal portion. Only stronger deviations from the average or expected value are perceived to be a foreground signal portion. Thus, it is of advantage to use a quite small separation threshold for signals with a small variance and to use a higher separation threshold for signals with a high variance. However, when inverse values are considered the situation is opposite to the above.

Both aspects, i.e., the first aspect having a non-binary separation into the foreground signal portion and the background signal portion based on the ratio between the block characteristic and the average characteristic and the second aspect comprising a variable threshold depending on the variability of the characteristic within the group of blocks, can be used separately from each other or can even be used together, i.e., in combination with each other. The latter alternative constitutes an embodiment as described later on.

Embodiments of the invention are related to a system where an input signal is decomposed into two signal components to which individual processing can be applied and where the processed signals are re-synthesized to form an output signal. Applause and also other transient signals can be seen as a superposition of distinctly and individually perceivable transient clap events and a more noise-like background signal. In order to modify characteristics such as the ratio of foreground and background signal density, etc., of such signals, it is advantageous to be able to apply an individual processing to each signal part. Additionally, a signal separation motivated by human perception is obtained. Furthermore, the concept can also be used as a measurement device to measure signal characteristics such as on a sender site and restore those characteristics on a receiver site.

Embodiments of the present invention do not exclusively aim at generating a multi-channel spatial output signal. A mono input signal is decomposed and individual signal parts are processed and re-synthesized to a mono output signal. In some embodiments the concept, as defined in the first or the second aspect, outputs measurements or side information instead of an audible signal.

Additionally, a separation is based on a perceptual aspect and advantageously a quantitative characteristic or value rather than a semantic aspect.

In accordance with embodiments, the separation is based on a deviation of an instantaneous energy with respect to an average energy within a considered short time frame. While a transient event with an energy level close to or below the average energy in such a time frame is not perceived as substantially different from the background, events with a high energy deviation can be distinguished from the background signal. This kind of signal separation adopts the principle and allows for processing closer to the human perception of transient events and closer to the human perception of foreground events over background events.

BRIEF DESCRIPTION OF THE DRAWINGS

Embodiments of the present invention will be discussed below with respect to the accompanying drawings, in which:

FIG. 1*f* illustrates a description of the concept for decomposing an audio signal in accordance with the first aspect, the second aspect and by referring to different thresholds;

DETAILED DESCRIPTION OF THE INVENTION

Figure 1A:
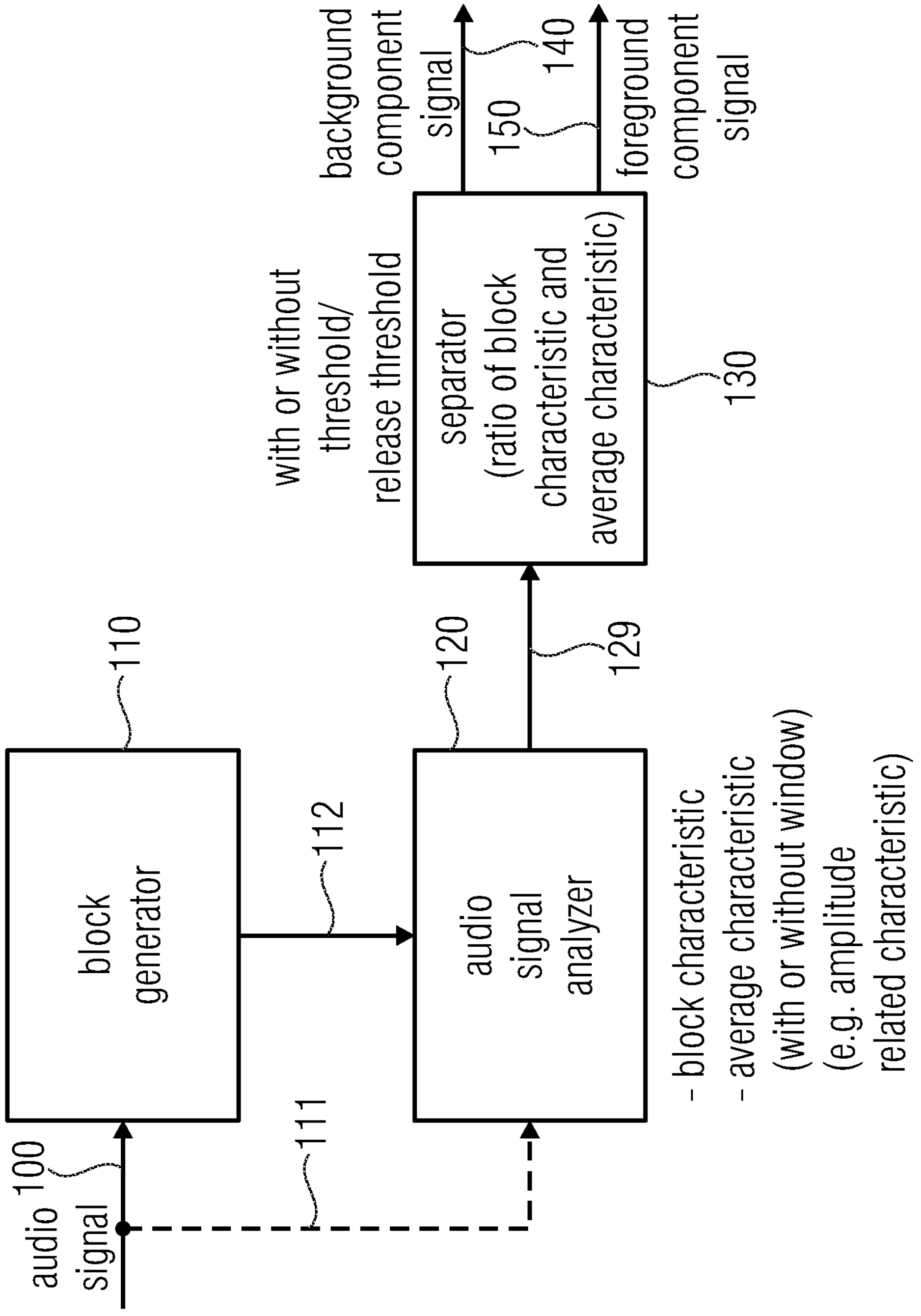
FIG. 1*a* is a block diagram of an apparatus for decomposing an audio signal relying on a ratio in accordance with a first aspect.

FIG. 1*a* illustrates an apparatus for decomposing an audio signal into a background component signal and a foreground component signal. The audio signal is input at an audio signal input 100. The audio signal input is connected to a block generator 110 for generating a time sequence of blocks of audio signal values output at line 112. Furthermore, the apparatus comprises an audio signal analyzer 120 for determining a block characteristic of a current block of the audio signal and for determining, in addition, an average characteristic for a group of blocks, wherein the group of blocks comprises at least 2 blocks. Advantageously, the group of blocks comprises at least one preceding block or at least one following block, and, in addition, the current block.

Furthermore, the apparatus comprises a separator 130 for separating the current block into a background portion and a foreground portion in response to a ratio of the block characteristic of the current block and the average characteristic. Thus, the ratio of the block characteristic of the current block and the average characteristic is used as a characteristic, based on which the separation of the current block of audio signal values is performed. Particularly, the background component signal at signal output 140 comprises the background portion of the current block, and the foreground component signal output at the foreground component signal output 150 comprises the foreground portion of the current block. The procedure illustrated in FIG. 1*a* is performed on a block-by-block basis, i.e., one block of the time sequence of blocks is processed after the other so that, in the end, when a sequence of blocks of audio signal values input at input 100 has been processed, a corresponding sequence of blocks of the background component signal and a same sequence of blocks of the foreground component signal exists at lines 140, 150 as will be discussed later on with respect to FIG. 3.

The audio signal analyzer may be configured for analyzing an amplitude-related measure as the block characteristic of the current block and, additionally, the audio signal analyzer 120 is configured for additionally analyzing the amplitude-related characteristic for the group of blocks as well.

A power measure or an energy measure for the current block and an average power measure or an average energy measure for the group of blocks may be determined by the audio signal analyzer, and a ratio between those two values for the current block is used by the separator 130 to perform the separation.

Figure 2:
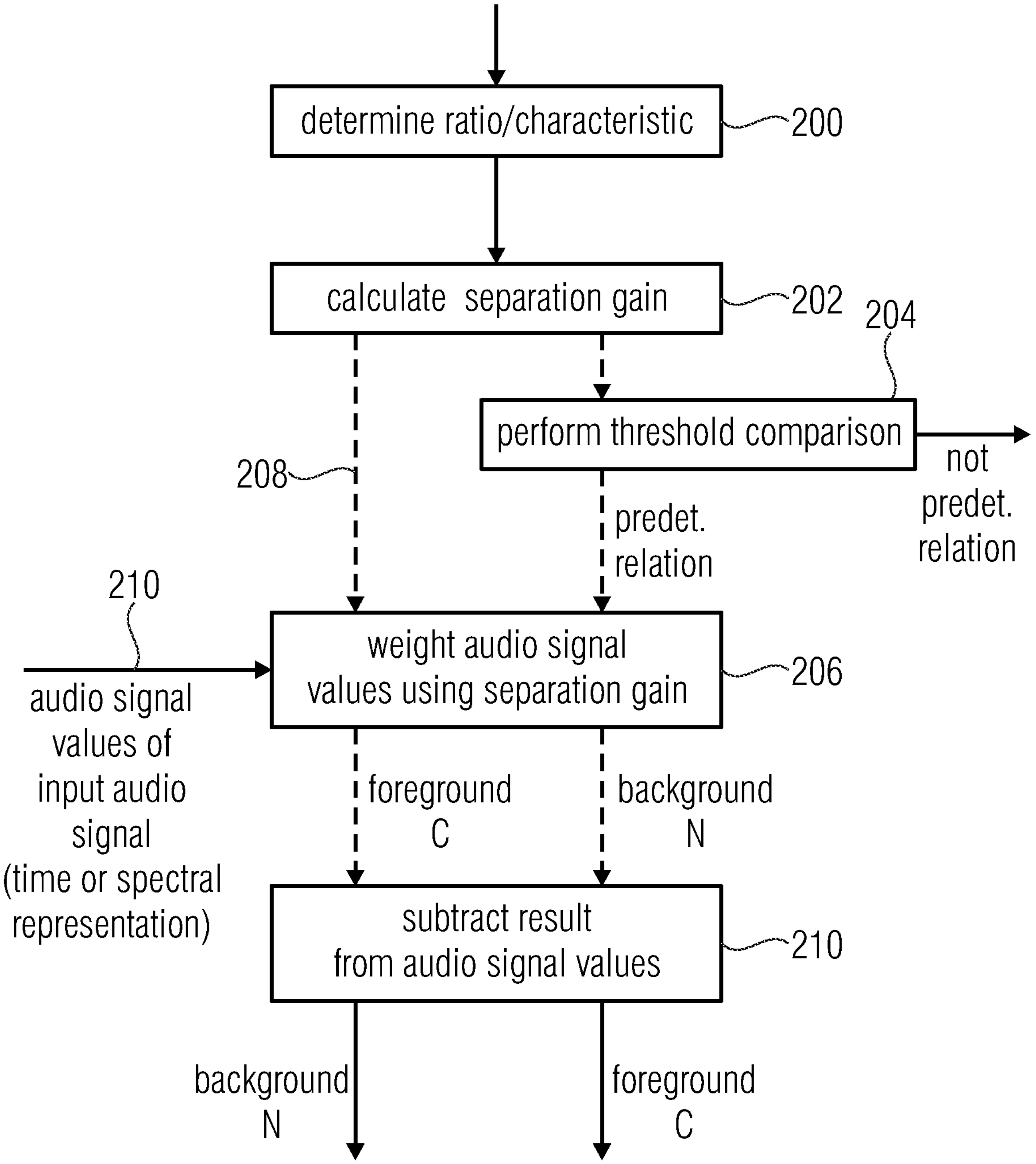
FIG. 2 illustrates two different ways for separating audio signal values of the current block into a foreground component and a background component in accordance with the first aspect, the second aspect or both aspects.

FIG. 2 illustrates a procedure performed by the separator 130 of FIG. 1*a* in accordance with the first aspect. Step 200 represents the determination of the ratio in accordance with the first aspect or the characteristic in accordance with the second aspect that does not necessarily have to be a ratio but can also be a block characteristic alone, for example.

In step 202, a separation gain is calculated from the ratio or the characteristic. Then, a threshold comparison in step 204 can be performed optionally. When a threshold comparison is performed in step 204, then the result can be that the characteristic is in a predetermined relation to the threshold. When this is the case, the control proceeds to step 206. When, however, it is determined in step 204 that the characteristic is not in relation to the predetermined threshold, then no separation is performed and the control proceeds to the next block in the sequence of blocks.

In accordance with the first aspect, a threshold comparison in step 204 can be performed or can, alternatively, not be performed as illustrated by the broken line 208. When it is determined in block 204 that the characteristic is in a predetermined relation to the separation threshold or, in the alternative of line 208, in any case, step 206 is performed, where the audio signals are weighted using a separation gain. To this end, step 206 receives the audio signal values of an input audio signal in a time representation or, advantageously, a spectral representation as illustrated by line 210. Then, depending on the application of the separation gain, the foreground component C is calculated as illustrated by the equation directly below FIG. 2. Specifically, the separation gain, which is a function of $g_N$ and the ratio $\Psi$ are not used directly, but in a difference form, i.e., the function is subtracted from 1. Alternatively, the background component N can be directly calculated by actually weighting the audio signal A(k,n) by the function of $g_N/\Psi(n)$.

FIG. 2 illustrates several possibilities for calculating the foreground component and the background component that all can be performed by the separator 130. One possibility is that both components are calculated using the separation gain. An alternative is that only the foreground component is calculated using the separation gain and the background component N is calculated by subtracting the foreground component from audio signal values as illustrated at 210. The other alternative, however, is that the background component N is calculated directly using the separation gain by block 206 and, then, the background component N is subtracted from the audio signal A to finally obtain the foreground component C. Thus, FIG. 2 illustrates 3 different embodiments for calculating the background component and the foreground component while each of those alternatives at least comprises the weighting of the audio signal values using the separation gain.

Figure 1B:
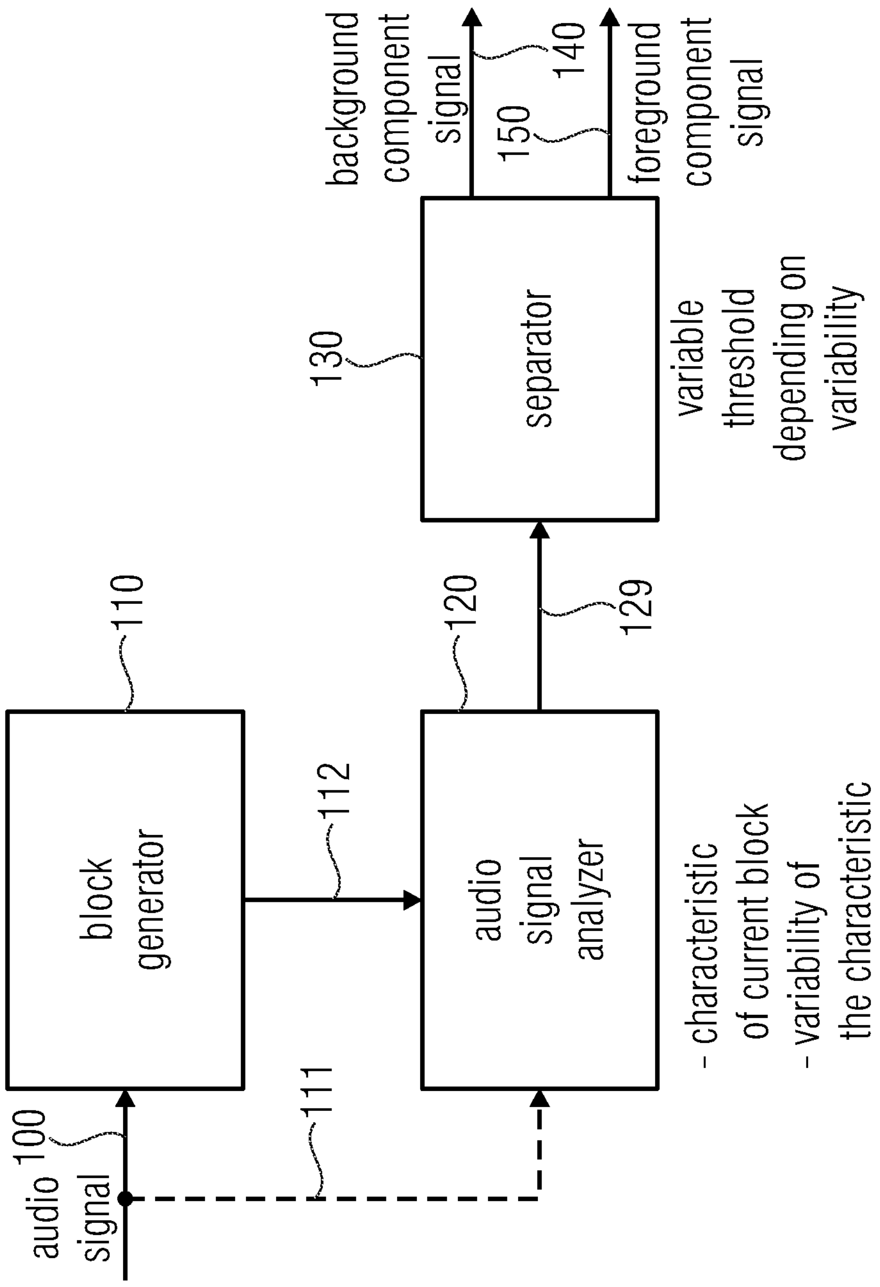
FIG. 1*b* is a block diagram of an embodiment of a concept for decomposing an audio signal relying on a variable separation threshold in accordance with a second aspect.

Subsequently, FIG. 1*b* is illustrated in order to describe the second aspect of the present invention relying on a variable separation threshold.

FIG. 1*b*, representing the second aspect, relies on the audio signal 100 that is input into the block generation 110 and the block generator is connected to the audio signal analyzer 120 via the connection line 122. Furthermore, the audio signal can be input into the audio signal analyzer directly via further connection line 111. The audio signal analyzer 120 is configured for determining a characteristic of the current block of the audio signal on the one hand and for, additionally, determining a variability of the characteristic within a group of blocks, the group of blocks comprising at least two blocks and advantageously comprising at least two preceding blocks or two following blocks or at least two preceding blocks, at least two following blocks and the current block as well.

The characteristic of the current block and the variability of the characteristic are both forwarded to the separator 130 via a connection line 129. The separator is then configured for separating the current block into a background portion and the foreground portion to generate the background component signal 140 and the foreground component signal 150. Particularly, the separator is configured, in accordance with the second aspect, to determine a separation threshold based on the variability determined by the audio signal analyzer and to separate the current block into the background component signal portion and the foreground component signal portion, when the characteristic of the current block is a predetermined relation to the separation threshold. When, however, the characteristic of the current block is not in the predetermined relation to the (variable) separation threshold, then no separation of the current block is performed and the whole current block is forwarded to or used or assigned as the background component signal 140.

Specifically, the separator 130 is configured to determine the first separation threshold for a first variability and a second separation threshold for a second variability, wherein the first separation threshold is lower than the second separation threshold and the first variability is lower than the second variability, and wherein the predetermined relation is "greater than".

Figure 4A:
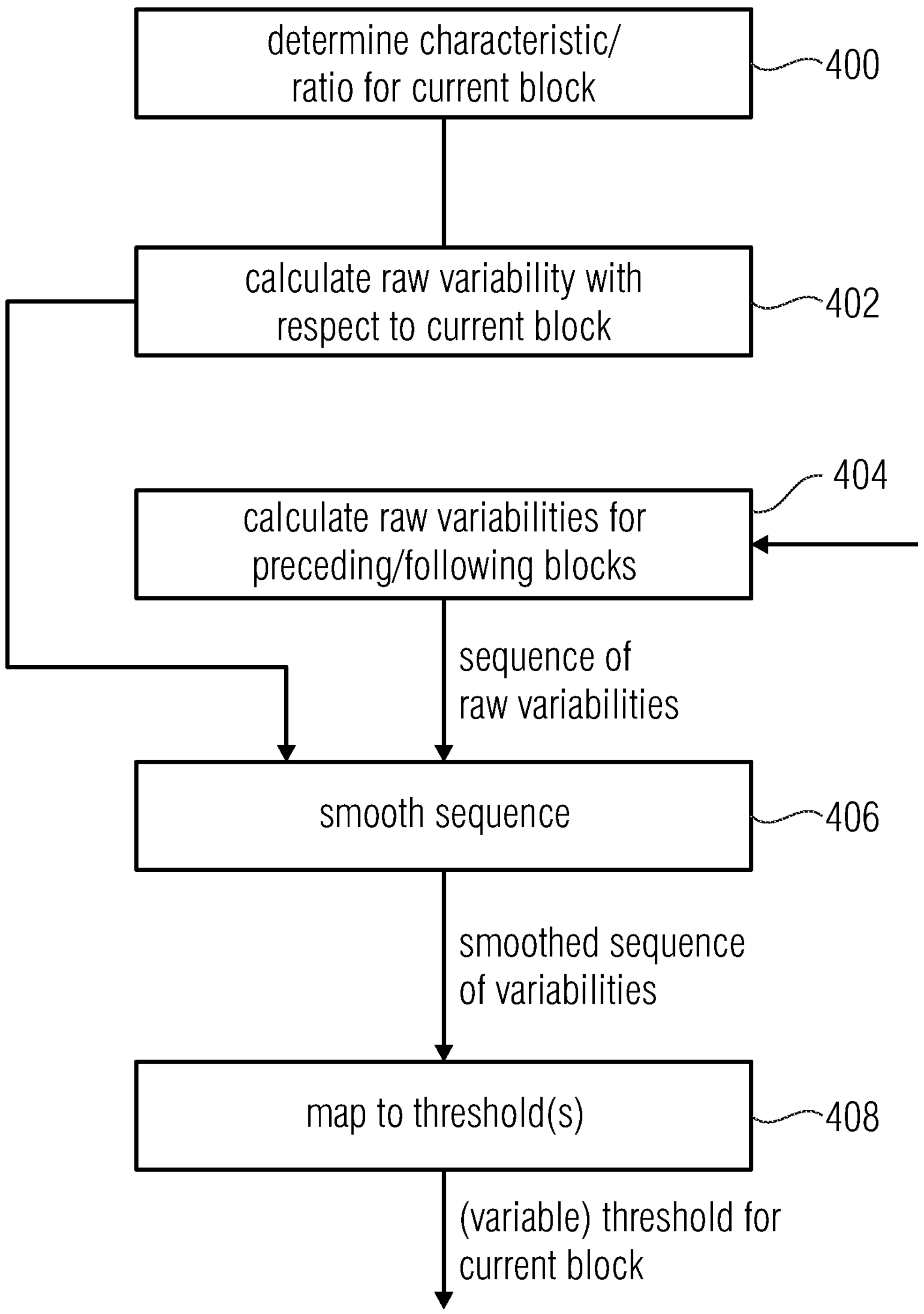
FIG. 4*a* illustrates a first alternative for determining a variable threshold based on a smoothing of raw variabilities.
Figure 4B:
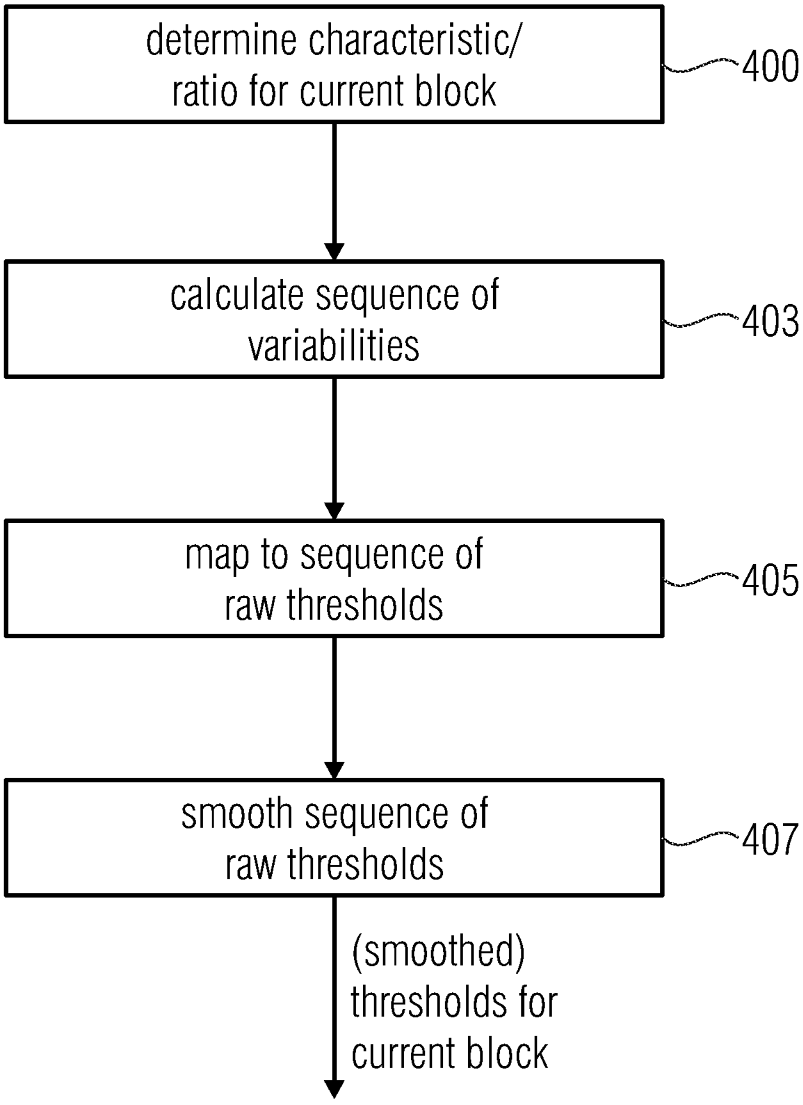
FIG. 4*b* illustrates a determination of a variable threshold based on a smoothing of raw thresholds.
Figure 4C:
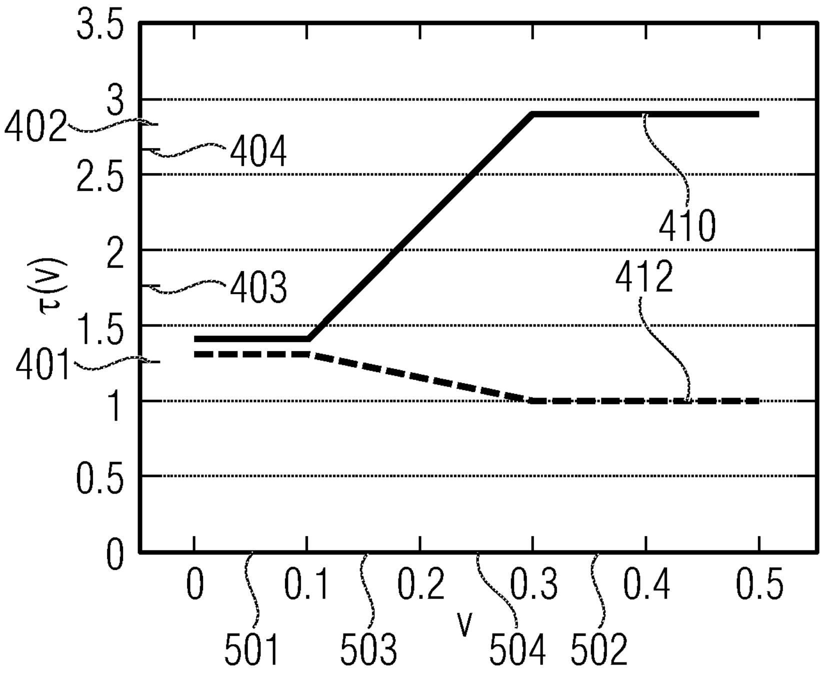
FIG. 4*c* illustrates different functions for mapping (smoothed) variabilities to thresholds.
Figure 4C:
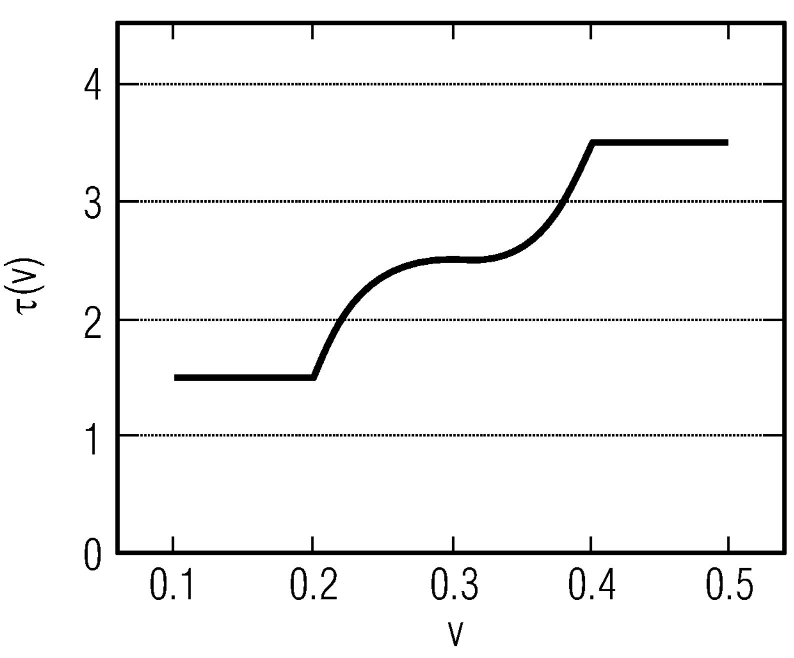

An example is illustrated in FIG. 4*c*, left portion, where the first separation threshold is indicated at 401, where the second separation threshold is indicated at 402, where the first variability is indicated at 501 and the second variability is indicated at 502. Particularly, reference is made to the upper piecewise linear function 410 representing the separation threshold while the lower piecewise linear function 412 in FIG. 4*c* illustrates the release threshold that will be described later. FIG. 4*c* illustrates the situation, where the thresholds are such that, for increasing variabilities, increasing thresholds are determined. When, however, the situation is implemented in such a way that, for example, inverse threshold values with respect to those in FIG. 4*c* are taken, then the situation is such that the separator is configured to determine a first separation threshold for a first variability and a second separation threshold for a second variability, wherein the first separation threshold is greater than the second separation threshold, and the first variability is lower than the second variability and, in this situation, the predetermined relation is "lower than", rather than "greater than" as in the first alternative illustrated in FIG. 4*c*.

Depending on certain implementations, the separator 130 is configured to determine the (variable) separation threshold either using a table access, where the functions illustrated in FIG. 4*c* left portion or right portion are stored or in accordance with a monotonic interpolation function interpolating between the first separation threshold 401 and the second separation threshold 402 so that, for a third variability 503, a third separation threshold 403 is obtained, and for a fourth variability 504, a fourth threshold is obtained, wherein the first separation threshold 401 is associated with the first variability 501 and the second separation threshold 402 is associated with the second variability 502, and wherein the third and the fourth variabilities 503, 504 are located, with respect to their values, between the first and the second variabilities and the third and the fourth separation thresholds 403, 404 are located, with respect to their values, between the first and the second separation thresholds 401, 402.

As illustrated in FIG. 4*c* left portion, the monotonic interpolation is a liner function or, as illustrated in FIG. 4*c* right portion, the monotonic interpolation function is a cube function or any power function with an order greater than 1.

Figure 6:
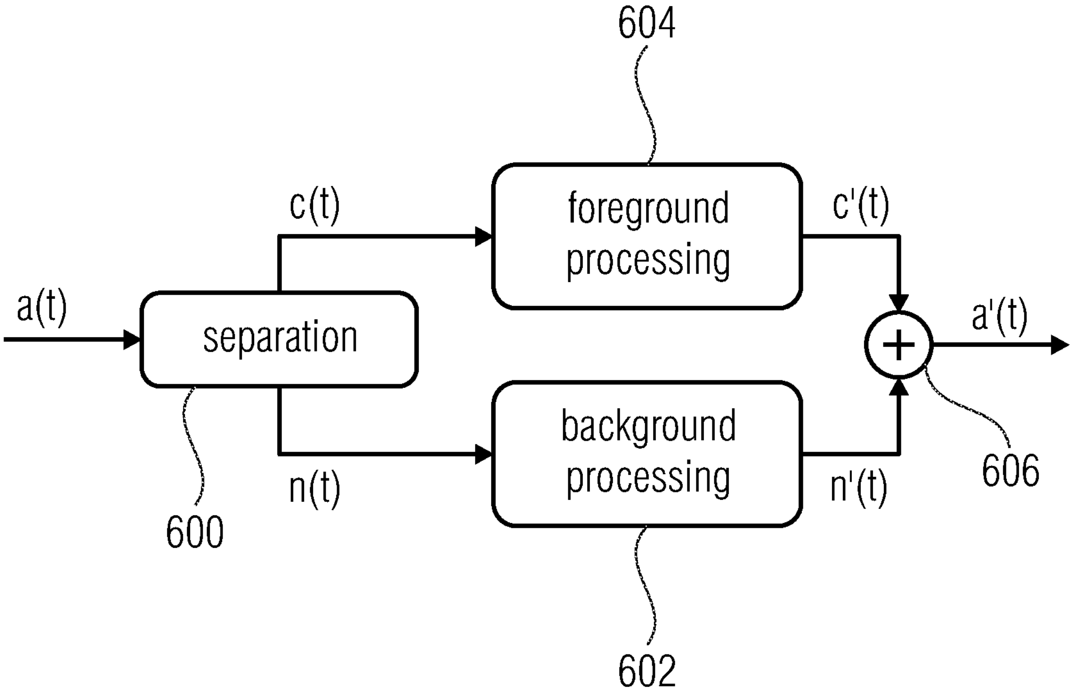
FIG. 6 illustrates a general overview over the separation, a foreground processing and a background processing and a subsequent signal re-synthesis.

FIG. 6 depicts a top-level block diagram of an applause signal separation, processing and synthesis of processed signals.

Particularly, a separation stage 600 that is illustrated in detail in FIG. 6 separates an input audio signal a(t) into a background signal n(t), and a foreground signal c(t), the background signal is input into a background processing stage 602 and the foreground signal is input into a foreground processing stage 604, and, subsequent to the processing, both signals n'(t) and c'(t) are combined by a combiner 606 to finally obtain the processed signal a'(t).

Based on signal separation/decomposition of the input signal a(t) into distinctly perceivable claps c(t) and more noise-like background signals n(t), an individual processing of the decomposed signal parts may be realized. After processing, the modified foreground and background signals c'(t) and n'(t) are re-synthesized resulting in the output signal a' (t).

Figure 1C:
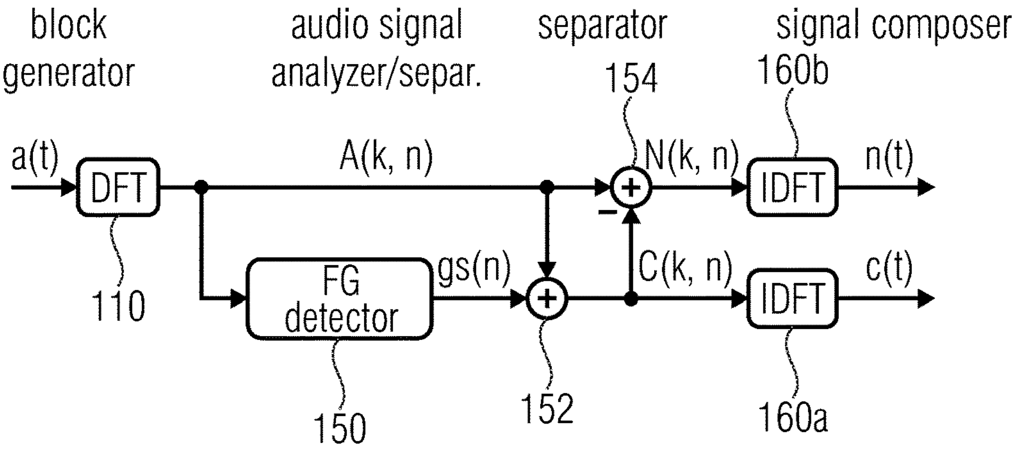
FIG. 1*c* illustrates a block diagram of an apparatus for decomposing an audio signal in accordance with the first aspect, the second aspect or both aspects.

FIG. 1*c* illustrates a top-level diagram of an applause separation stage. An applause model is given in equation 1 and is illustrated in FIG. 1*f*, where an applause signal A(k,n) consists of a superposition of distinctly and individually perceivable foreground claps C(k,n) and a more noise-like background signal N(k,n). The signals are considered in frequency domain with high time resolution, whereas k and n denote the discrete frequency k and time n indices of a short-time frequency transform, respectively.

Particularly, the system in FIG. 1*c* illustrates a DFT processor 110 as the block generator, a foreground detector having functionalities of the audio signal analyzer 120 and the separator 130 of FIG. 1*a* or FIG. 1*b*, and further signal separator stages such as a weighter 152, performing the functionality discussed with respect to step 206 of FIG. 2, and a subtractor 154 implementing the functionality illustrated in step 210 of FIG. 2. Furthermore, a signal composer is provided that composes, from a corresponding frequency domain representation, the time domain foreground signal c(t) and the background signal n(t), where the signal composer comprises, for each signal component, a DFT block 160*a*, 160*b*.

The applause input signal a(t), i.e., the input signal comprising background components and applause components, is fed into a signal switch (not shown in FIG. 1*c*) as well as into the foreground detector 150 where, based on the signal characteristics, frames are identified which correspond to foreground claps. The detector stage 150 outputs the separation gain $g_{s(n)}$ which is fed into the signal switch and controls the signal amounts routed into the distinctly and individually perceivable clap signal C(k,n) and the more noise-line signal N(k,n). The signal switch is illustrated in block 170 for illustrating a binary switch, i.e., that a certain frame or time/frequency tile, i.e., only a certain frequency bin of a certain frame is routed to either C or N, in accordance with the second aspect. In accordance with the first aspect, the gain is used for separating each frame or several frequency bins of the spectral representation A(k,n) into a foreground component and a background component so that, in accordance with the gain $g_{s(n)}$, that relies on the ratio between the block characteristic and the average characteristic in accordance with the first aspect, the whole frame or at least one or more time/frequency tiles or frequency bins are separated so that the corresponding bin in each of the signals C and N has the same value, but with a different amplitude where the relation of the amplitudes depends on $g_{s(n)}$.

Figure 1D:
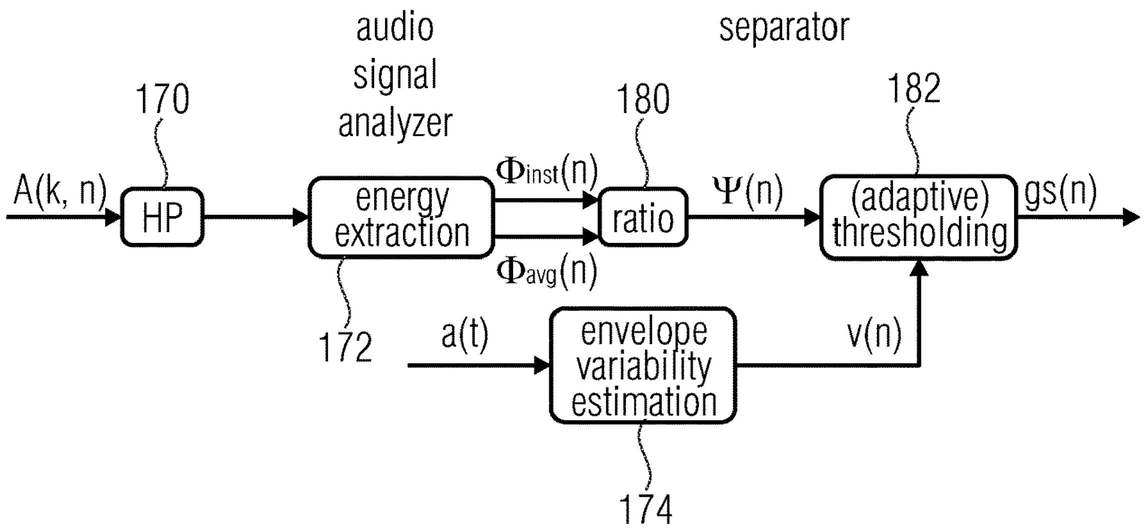
FIG. 1*d* illustrates an illustration of the audio signal analyzer and the separator in accordance with the first aspect, the second aspect or both aspects.

FIG. 1*d* illustrates a more detailed embodiment of the foreground detector 150 specifically illustrating the functionalities of the audio signal analyzer. In an embodiment, the audio signal analyzer receives a spectral representation generated by the block generator having the DFT (Discrete Fourier Transform) block 110 of FIG. 1*c*. Furthermore, the audio signal analyzer is configured to perform a high pass filtering with a certain predetermined cross-over frequency in block 170. Then, the audio signal analyzer 120 of FIG. 1*a* or 1*b* performs an energy extraction procedure in block 172. The energy extraction procedure results in an instant or current energy of the current block $\Phi_{inst}$(n) and an average energy $\Phi_{avg}$(n).

The signal separator 130 in FIG. 1*a* or 1*b* then determines a ratio as illustrated at 180 and, additionally, determines an adaptive or non-adaptive threshold and performs the corresponding thresholding operation 182.

Furthermore, when the adaptive thresholding operation in accordance with the second aspect is performed, then the audio signal analyzer additionally performs an envelope variability estimation as illustrated in block 174, and the variability measure v(n) is forwarded to the separator, and particularly, to the adaptive thresholding processing block 182 to finally obtain the gain $g_s$(n) as will be described later on.

A flow chart of the internals of the foreground signal detector is depicted in FIG. 1*d*. If only the upper path is considered, this corresponds to a case without adaptive thresholding whereas adaptive thresholding is possible if also the lower path is taken into account. The signal fed into the foreground signal detector is high pass filtered and its average ($\bar{\Phi}_A$) and instantaneous ($\Phi_A$) energy is estimated. The instantaneous energies of a signal X(k, n) is given by $\Phi_x(n)=\| X(k, n)\|$, where $\|\cdot\|$ denotes the vector norm and the average energy is given by:

$$\bar{\Phi}_A(n) = \frac{\sum_{m=-M}^{M} \Phi_A(n-m)\cdot w(m+M)}{\sum_{m=-M}^{M} w(m+M)}$$

where w(n) denotes a weighting window applied to the instantaneous energy estimates with window length $L_w$=2M+1. As an indication as to whether a distinct clap is active within the input signal, the energy ratio Ψ(n) of instantaneous and average energy is used according to;

$$\Psi(n) = \frac{\Phi_A(n)}{\bar{\Phi}_A(n)}$$

Figure 1E:
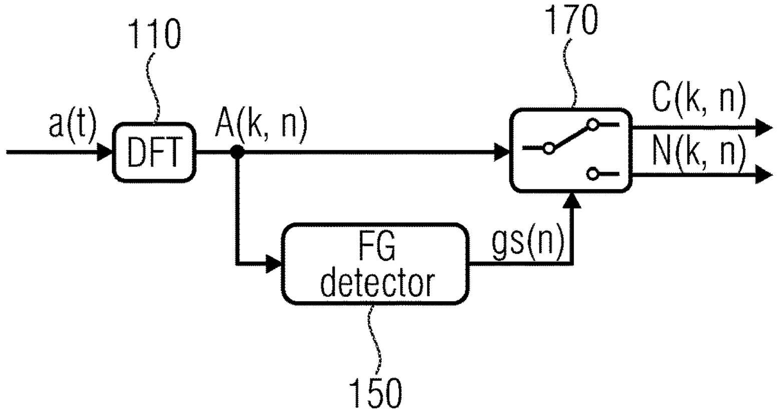
FIG. 1*e* illustrates an embodiment of the signal separator in accordance with the second aspect.

In the simpler case without adaptive thresholding, for time instances where the energy ratio exceeds the attack threshold $\tau_{attack}$, the separation gain which extracts the distinct clap part from the input signal is set to 1; consequently, the noise-like signal is zero at these time instances. A block diagram of a system with hard signal switching is depicted in FIG. 1*e*. If signal drop outs in the noise-like signal are avoided, a correction term can be subtracted from the gain. A good starting point is letting the average energy of the input signal remain within the noise-like signal. This is done by subtracting $\sqrt{\Psi(n)^{-1}}$ or $\Psi(n)^{-1}$ from the gain. The amount of average energy can also be controlled by introducing a gain $g_N \geq 0$ which controls how much of the average energy remains within the noise-like signal. This leads to the general form of the separation gain:

$$g_s(n) = \begin{cases} \max\left(1-\sqrt{\frac{g_N}{\Psi(n)}},\ 0\right), & \text{if } \Psi(n) \geq \tau_{attack} \\ 0, & \text{else.} \end{cases}$$

In a further embodiment, the above equation is replaced by the following equation:

$$g_s(n) = \begin{cases} \sqrt{\max\left(1-\frac{g_N}{\Psi(n)},\ 0\right)}, & \text{if } \Psi(n) \geq \tau_{attack} \\ 0, & \text{else.} \end{cases}$$

Note: if $\tau_{attack}$=0, the amount of signal routed to the distinctive clap only depends on the energy ratio Ψ(n) and the fixed gain $g_N$ yielding a signal dependent soft decision. In a well-tuned system, the time period in which the energy ratio exceeds the attack thresholds captures only the actual transient event. In some cases, it might be desirable to extract a longer period of time frames after an attack occurred. This can be done, for instance, by introducing a release threshold $\tau_{release}$ indicating the level to which the energy ratio Ψ has to decrease after an attack before the separation gain is set back to zero:

$$g_s(n) = \begin{cases} \max\left(1-\sqrt{\frac{g_N}{\Psi(n)}},\ 0\right), & \text{if } \Psi(n) \geq \tau_{attack}, \\ g_s(n-1), & \text{if } \tau_{attack} > \Psi(n) > \tau_{release}, \\ 0, & \text{if } \Psi(n) \leq \tau_{release} \end{cases}$$

In a further embodiment, the immediately preceding equation is replaced by the following equation:

$$g_s(n) = \begin{cases} \sqrt{\max\left(1-\frac{g_N}{\Psi(n)},\ 0\right)}, & \text{if } \Psi(n) \geq \tau_{attack}, \\ g_s(n-1), & \text{if } \tau_{attack} > \Psi(n) > \tau_{release}, \\ 0, & \text{if } \Psi(n) \leq \tau_{release} \end{cases}$$

An alternative but more static method is to simply route a certain number of frames after a detected attack to the distinct clap signal.

In order to increase flexibility of the thresholding, thresholds could be chosen in a signal adaptive manner resulting in $\tau_{attack}$ (n) and $\tau_{release}$ (n) respectively. The thresholds are controlled by an estimate of the variability of the envelope of the applause input signal, where a high variability indicates the presence of distinctive and individually perceivable claps and a rather low variability indicates a more noise-like and stationary signal. Variability estimation could be done in time domain as well as in frequency domain. An advantageous method in this case is to do the estimation in frequency domain:

$$v'(n)=\mathrm{var}([\Phi_A(n-M),\Phi_A(n-M+1),\ldots,\Phi_A(n+m)]),\quad m=-M\ldots M$$

where var(·) denotes the variance computation. To yield a more stable signal, the estimated variability is smoothed by low pass filtering yielding the final envelope variability estimate $$v(n)=h_{TP}(n)*v'(n)$$

where * denotes a convolution. The mapping of envelope variability to corresponding threshold values can be done by mapping functions $f_{attack}(x)$ and $f_{release}(x)$ such that $$\tau_{attack}(n)=f_{attack}(v(n))$$

$$\tau_{release}(n)=f_{release}(v(n))$$

In one embodiment, the mapping function could be realized as clipped linear functions, which corresponds to a linear interpolation of the thresholds. The configuration for this scenario is depicted in FIG. 4*c*. Furthermore, also a cubic mapping function or functions with higher order in general could be used. In particular, the saddle points could be used to define extra threshold levels for variability values in between those defined for sparse and dense applause. This is exemplarily illustrated in FIG. 4*c*, right hand side.

The separated signals are obtained by $$C(k,n)=g_s(n)\cdot A(k,n)$$

$$N(k,n)=A(k,n)-C(k,n)$$

FIG. 1*f* illustrates the above discussed equations in an overview and in relation to the functional blocks in FIGS. 1*a* and 1*b*.

Furthermore, FIG. 1*f* illustrates a situation, where, depending on a certain embodiment, no threshold, a single threshold or a double threshold is applied.

Furthermore, as illustrated with respect to equations (7) to (9) in FIG. 1*f*, adaptive thresholds can be used. Naturally, either a single threshold is used as a single adaptive threshold. Then, only equation (8) would be active and equation (9) would not be active. However, it is of advantage to perform double adaptive thresholding in certain embodiments, implementing features of the first aspect and the second aspect together.

Figure 7:
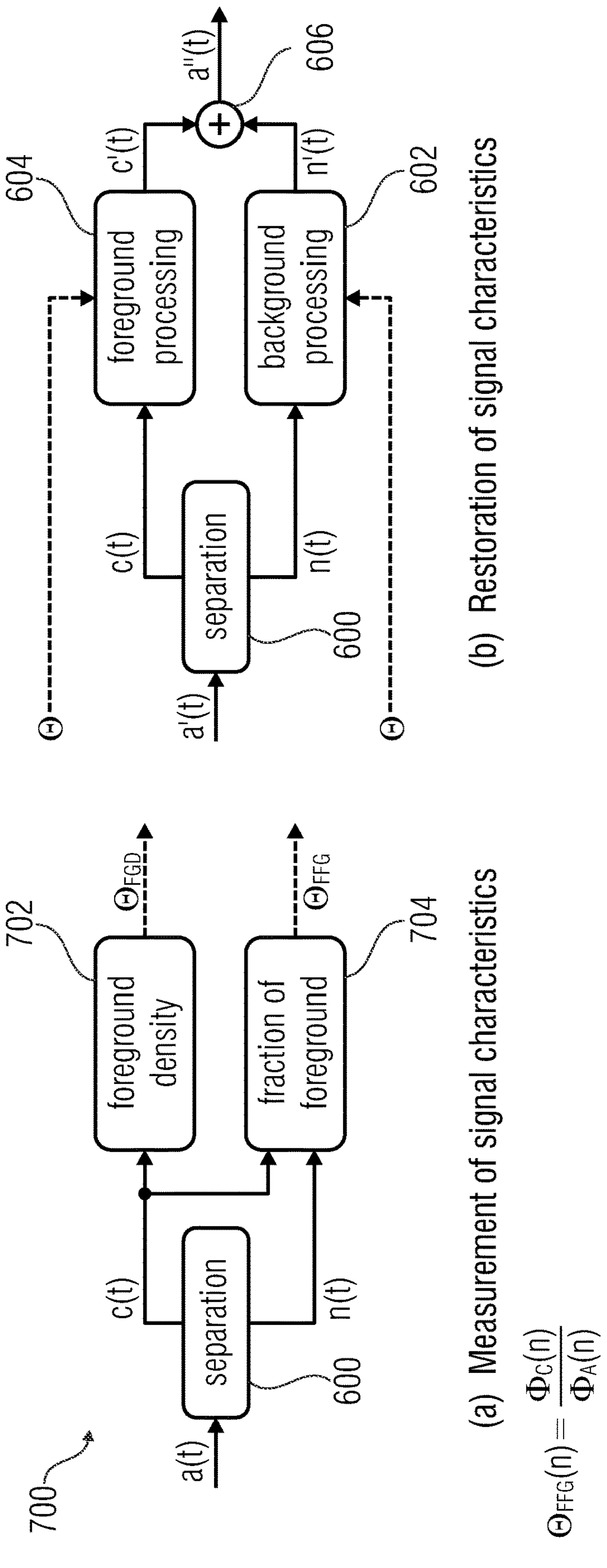
FIG. 7 illustrates a measurement and restoration of signal characteristics with or without metadata.
Figure 8:
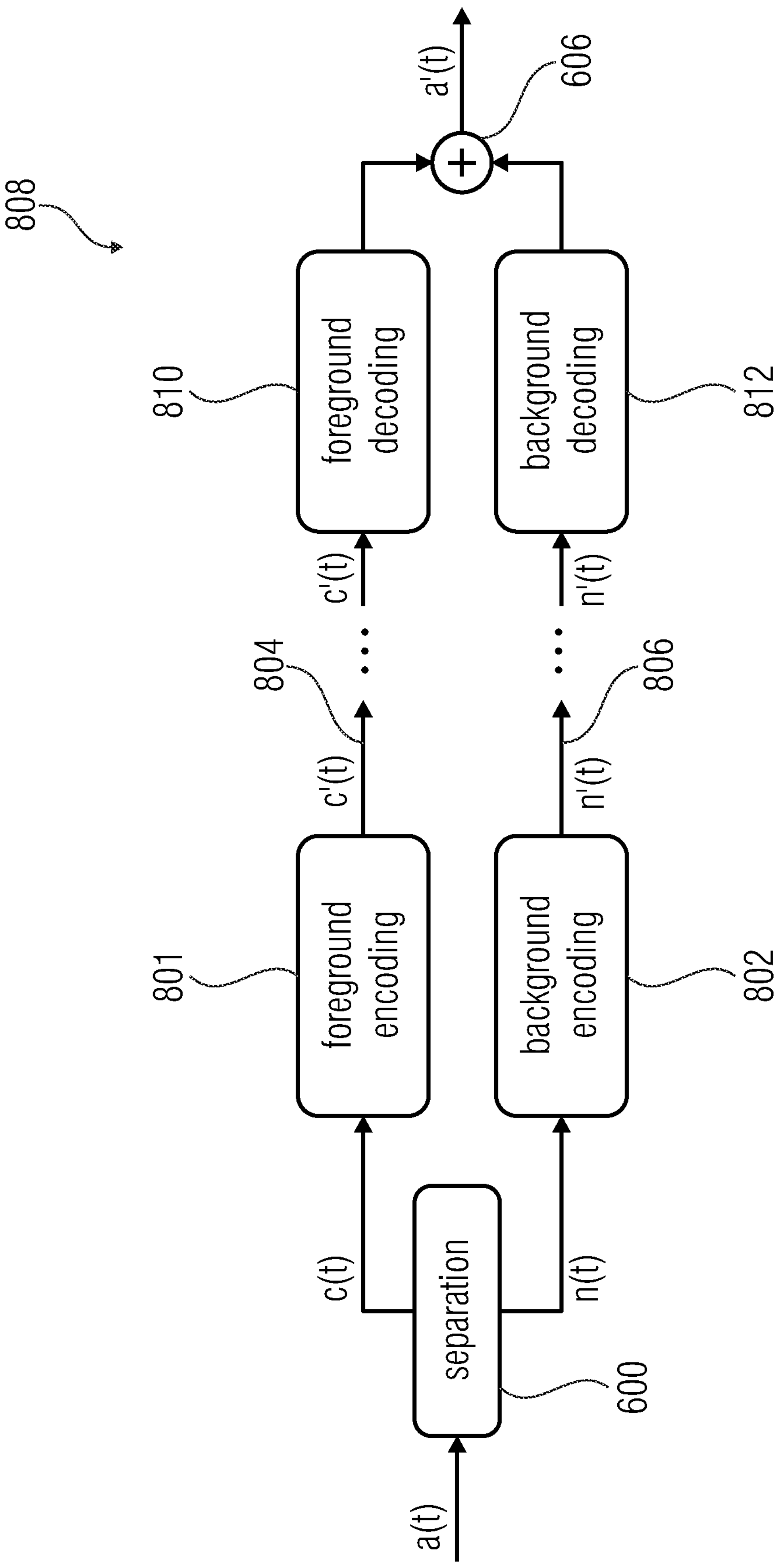
FIG. 8 illustrates a block diagram for an encoder-decoder use case.

Furthermore, FIGS. 7 and 8 illustrate further implementations as to how one could implement a certain application of the present invention.

Particularly, FIG. 7, left portion, illustrates a signal characteristic measurer 700 for measuring a signal characteristic of the background component signal or the foreground component signal. Particularly, the signal characteristic measure 700 is configured to determine a foreground density in block 702 illustrating a foreground density calculator using the foreground component signal or, alternatively, or additionally, the signal characteristic measurer is configured to perform a foreground prominence calculation using a foreground prominence calculator 704 that calculates the fraction of the foreground in relation to the original input signal a(t).

Alternatively, as illustrated in the right portion of FIG. 7, a foreground processor 604 and a background processor 602 are there, where these processors, in contrast to FIG. 6, rely on certain metadata θ that can be the metadata derived by FIG. 7, left portion or can be any other useful metadata for performing foreground processing and background processing.

The separated applause signal parts can be fed into measurement stages where certain (perceptually motivated) characteristics of transient signals can be measured. An exemplary configuration for such a use case is depicted in FIG. 7*a*, where the density of the distinctly and individually perceivable foreground claps as well as the energy fraction of the foreground claps with respect to the total signal energy is estimated.

Estimating the foreground density $\Theta_{FGD}$ (n) can be done by counting the event rate per second, i.e. the number of detected claps per second. The foreground prominence $\Theta_{FFG}$(n) is given by the energy ratio of estimated foreground clap signal C(n) and A(n):

$$\Theta_{FFG}(n)=\frac{\Phi_C(n)}{\Phi_A(n)}$$

A block diagram of the restoration of the measured signal characteristics is depicted in FIG. 7*b*, where θ and the dashed lines denote side information.

While in the previous embodiment, the signal characteristic was only measured, the system is used to modify signal characteristics. In one embodiment, the foreground processing could output a reduced number of the detected foreground claps resulting in a density modification towards lower density of the resulting output signal. In another embodiment, the foreground processing could output an increased number of foreground claps, e.g., by adding a delayed version of the foreground clap signal to itself resulting in a density modification towards increased density. Furthermore, by applying weights in the respective processing stages, the balance of foreground claps and noise-like background could be modified. Additionally, any processing like filtering, adding reverb, delay, etc. in both paths can be used to modify the characteristics of an applause signal.

FIG. 8 furthermore relates to an encoder stage for encoding the foreground component signal and the background component signal to obtain an encoded representation of the foreground component signal and a separate encoded representation of the background component signal for transmission or storage. Particularly, the foreground encoder is illustrated at 801 and the background encoder is illustrated at 802. The separately encoded representations 804 and 806 are forwarded to a decoder-side device 808 consisting of a foreground decoder 810 and a background decoder 812 that finally decode the separate representations and the decoded representations and then combined by a combiner 606 to finally output the decoded signal a' (t).

Figure 3:
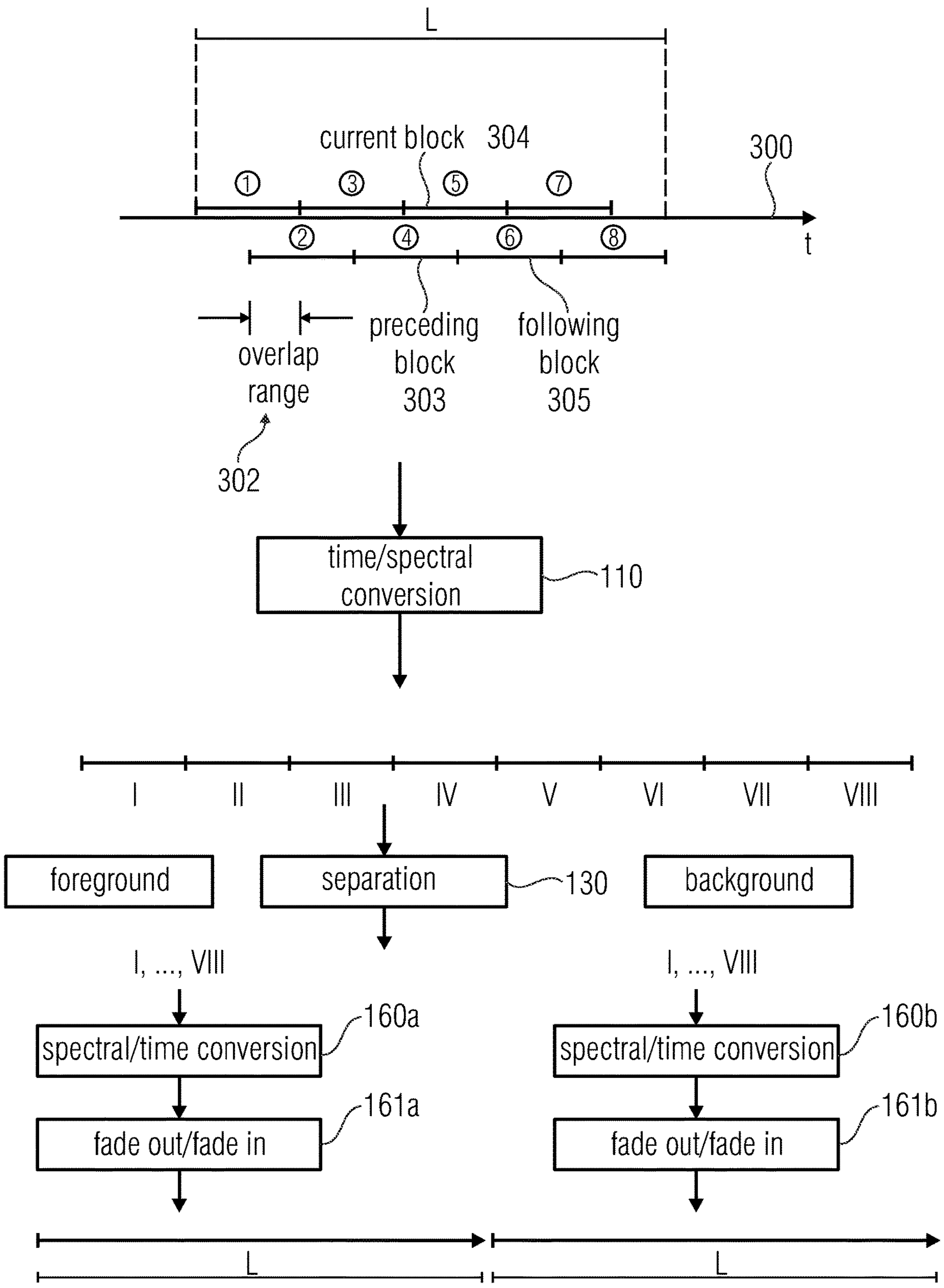
FIG. 3 illustrates a schematic representation of overlapping blocks generated by the block generator and the generation of time domain foreground component signals and background component signals subsequent to a separation.

Subsequently, further embodiments are discussed with respect to FIG. 3. In particular, FIG. 3 illustrates a schematic representation of the input audio signal given on a time line 300, where the schematic representation illustrates a situation of timely overlapping blocks. Illustrated in FIG. 3 is a situation where there is an overlap range 302 of 50%. Other overlap ranges, such as multi-overlap ranges with more than 50% or less overlap ranges where only portions less than 50% overlap is also usable.

In the FIG. 3 embodiment, a block typically has less than 600 sampling values and, advantageously, only 256 or only 128 sampling values to obtain a high time resolution.

The exemplarily illustrated overlapping blocks consist, for example, of a current block 304 that overlaps within the overlap range with a preceding block 303 or a following block 305. Thus, when a group of blocks comprises at least two preceding blocks then this group of blocks would consist of the preceding block 303 with respect to the current block 304 and the further preceding block indicated with order number 3 in FIG. 3. Furthermore, and analogously, when a group of blocks comprises at least two following block (in time) then these two following blocks would comprise the following block 305 indicated with order number 6 and the further block 7 illustrated with order number 7.

These blocks are, for example, formed by the block generator 110 that may also perform a time-spectral conversion such as the DFT mentioned earlier or an FFT (Fast Fourier transform).

The result of the time-spectral conversion is a sequence of spectral blocks I to VIII, where each spectral block illustrated in FIG. 3 below block 110 corresponds to one of eight blocks of the time line 300.

A separation may then be performed in the frequency domain, i.e., using the spectral representation where the audio signal values are spectral values. Subsequent to the separation, a foreground spectral representation, once again consisting of blocks I to VIII, and a background representation consisting of I to VIII, are obtained. Naturally, and depending on the thresholding operation, it is not necessarily the case that each block of the foreground representation subsequent to the separation 130 has values different from zero. However, advantageously, it is made sure by at least the first aspect of the present invention that each block in the spectral representation of the background component has values different from zero in order to avoid a drop out of energy in the background signal component.

For each component, i.e., the foreground component and the background component, a spectral-time conversion is performed as has been discussed in the context of FIG. 1*c* and the subsequent fade-out/fade-in with respect to the overlap range 302 is performed for both components as illustrated at block 161*a* and block 161*b* for the foreground and the background components respectively. Thus, in the end, the foreground signal and the background signal both have the same length L as the original audio signal before the separation.

Advantageously, as illustrated in FIG. 4*b*, the separator 130 calculating the variabilities or thresholds are smoothed.

In particular, step 400 illustrates the determination of a general characteristic or a ratio between a block characteristic and an average characteristic for a current block as illustrated at 400.

In block 402, a raw variability is calculated with respect to the current block. In block 404, raw variabilities for preceding or following blocks are calculated to obtain, by the output of block 402 and 404, a sequence of raw variabilities. In block 406, the sequence is smoothed. Thus, at the output of block 406 a smoothed sequence of variabilities exists. The variabilities of the smoothed sequence are mapped to corresponding adaptive thresholds as illustrated in block 408 so that one obtains the variable threshold for the current block.

An alternative embodiment is illustrated in FIG. 4*b* in which, in contrast to smoothing the variabilities, the thresholds are smoothed. To this end, once again, the characteristic/ratio for a current block is determined as illustrated in block 400.

In block 403, a sequence of variabilities is calculated using, for example, equation 6 of FIG. 1*f* for each current block indicated by integer m.

In block 405, the sequence of variabilities is mapped to a sequence of raw thresholds in accordance with equation 8 and equation 9 but with non-smoothed variabilities in contrast to equation 7 of FIG. 1*f*.

In block 407, the sequence of raw thresholds is smoothed in order to finally obtain the (smoothed) threshold for the current block.

Figure 5:
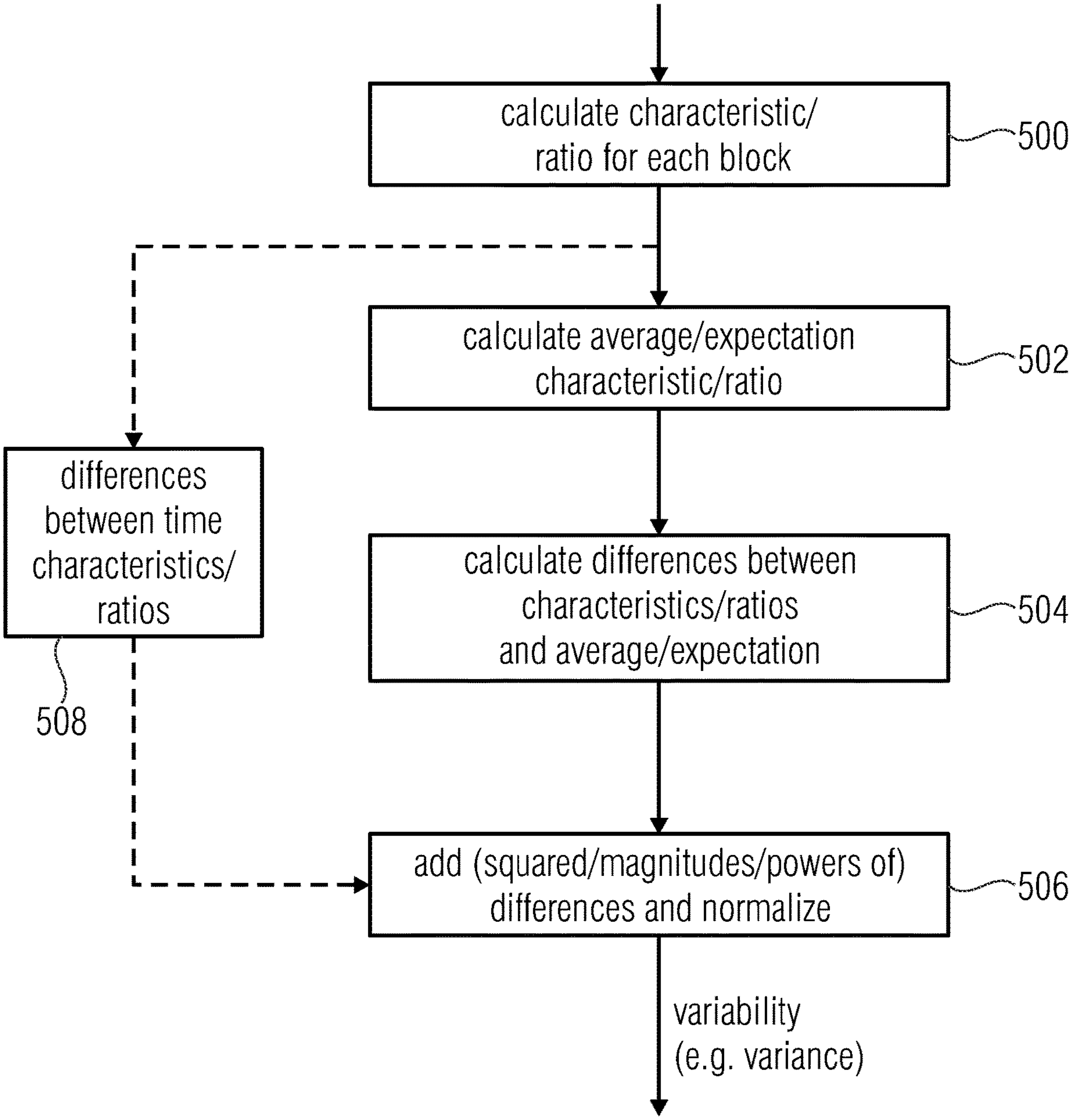
FIG. 5 illustrates an implementation for determining the variability as used in the second aspect.

Subsequently, FIG. 5 is discussed in more detail in order to illustrate different ways for calculating the variability of the characteristic within a group of blocks.

Once again, in step 500, a characteristic or ratio between a current block characteristic and an average block characteristic is calculated.

In step 502, an average or, generally, an expectation over the characteristics/ratios for the group of blocks is calculated.

In block 504, differences between characteristics/ratios and the average value/expectation value are calculated and, as illustrated in block 506, the addition of the differences or certain values derived from the differences may be performed with a normalization. When the squared differences are added then the sequence of steps 502, 504, 506 reflect the calculation of a variance as has been outlined with respect to equation 6. However, for example, when magnitudes of differences or other powers of differences different from two are added together then a different statistical value derived from the differences between the characteristics and the average/expectation value is used as the variability.

Alternatively, however, as illustrated in step 508, also differences between time-following characteristics/ratios for adjacent blocks are calculated and used as the variability measure. Thus, block 508 determines a variability that does not rely on an average value but that relies on a change from one block to the other, wherein, as illustrated in FIG. 6, the differences between the characteristics for adjacent blocks can be added together either squared, the magnitudes thereof or powers thereof to finally obtain another value from the variability different from the variance. It is clear for those skilled in the art that other variability measures different from what has been discussed with respect to FIG. 5 can be used as well.

Subsequently, examples of embodiments are defined that can be used separately from the below examples or in combination with any of the below examples:

1. Apparatus for decomposing an audio signal (100) into a background component signal (140) and a foreground component signal (150), the apparatus comprising:
   - a block generator (110) for generating a time sequence of blocks of audio signal values;
   - an audio signal analyzer (120) for determining a block characteristic of a current block of the audio signal and for determining an average characteristic for a group of blocks, the group of blocks comprising at least two blocks; and
   - a separator (130) for separating the current block into a background portion and a foreground portion in response to a ratio of the block characteristic of the current block and the average characteristic of the group of blocks,
   - wherein the background component signal (140) comprises the background portion of the current block and the foreground component signal (150) comprises the foreground portion of the current block.

2. Apparatus of example 1, wherein the audio signal analyzer is configured for analyzing an amplitude-related measure as the characteristic of the current block and the amplitude-related characteristic as the average characteristic for the group of blocks.

3. Apparatus of example 1 or 2, wherein the audio signal analyzer (120) is configured for analyzing a power measure or an energy measure for the current block and an average power measure or an average energy measure for the group of blocks.

4. Apparatus of one of the preceding examples, wherein the separator (130) is configured to calculate a separation gain from the ratio, to weight the audio signal values of the current block using the separation gain to obtain the foreground portion of the current frame and to determine the background component so that the background signal constitutes a remaining signal, or wherein the separator is configured to calculate a separation gain from the ratio, to weight the audio signal values of the current block using the separation gain to obtain the background portion of the current frame and to determine the foreground component so that the foreground component signal constitutes a remaining signal.

5. Apparatus of one of the preceding examples, wherein the separator (130) is configured to calculate a separation gain using weighting the ratio using a predetermined weighting factor different from zero.

6. Apparatus of example 5, wherein the separator (130) is configured to calculate the separation gain using a term $1-(g_N/\psi n)^P$ or $(\max(1-(g_N/\psi(n)))^P$, wherein $g_N$ is the predetermined factor, $\psi(n)$ is the ratio and p is a power greater than zero and being an integer or a non-integer number, and wherein n is a block index, and wherein max is a maximum function.

7. Apparatus of one of the preceding examples, wherein the separator (130) is configured to compare a ratio of the current block to a threshold and to separate the current block, when the ratio of the current block is in a predetermined relation to the threshold and wherein the separator (130) is configured to not separate a further block, the further block having a ratio not having the predetermined relation to the threshold, so that the further block fully belongs to the background component signal (140).

8. Apparatus of example 7, wherein the separator (130) is configured to separate a following block following the current block in time using comparing the ratio of the following block to a further release threshold, wherein the further release threshold is set such that a block ratio that is not in the predetermined relation to the threshold is in the predetermined relation to the further release threshold.

9. Apparatus of example 8, wherein the predetermined relation is "greater than" and wherein the release threshold is lower than separation threshold, or wherein the predetermined relation is "lower than" and wherein the release threshold is greater than the separation threshold.

10. Apparatus of one of the preceding examples, wherein the block generator (110) is configured to determine timely overlapping blocks of audio signal values or wherein the temporally overlapping blocks have a number of sampling values being less than or equal to 600.

11. Apparatus of one of the preceding examples, wherein the block generator is configured to perform a block-wise conversion of the time domain audio signal into a frequency domain to obtain a spectral representation for each block, wherein the audio signal analyzer is configured to calculate the characteristic using the spectral representation of the current block, and wherein the separator (130) is configured to separate the spectral representation into the background portion and the foreground portion so that, for spectral bins of the background portion and the foreground portion corresponding to the same frequency, each have a spectral value different from zero, wherein a relation of the spectral value of the foreground portion and the spectral value of the background portion within the same frequency bin depends on the ratio.

12. Apparatus of one of the preceding examples, wherein the block generator (110) is configured to perform a block-wise conversion of the time domain into the frequency domain to obtain a spectral representation for each block, wherein time adjacent blocks are overlapping in an overlapping range (302), wherein the apparatus further comprises a signal composer (160*a*, 161*a*, 160*b*, 161*b*) for composing the background component signal and for composing the foreground component signal, wherein the signal composer is configured for performing a frequency-time conversion (161*a*, 160*a*, 160*b*) for the background component signal and for the foreground component signal and for cross-fading (161*a*, 161*b*) time representations of time-adjacent blocks within the overlapping range to obtain a time domain foreground component signal and a separate time domain background component signal.

13. Apparatus of one of the preceding examples, wherein the audio signal analyzer (120) is configured to determine the average characteristic for the group of blocks using a weighted addition of individual characteristics of blocks in the group of blocks.

14. Apparatus of one of the preceding examples, wherein the audio signal analyzer (120) is configured to perform a weighted addition of individual characteristics of blocks in the group of blocks, wherein a weighting value for a characteristic of a block close in time to the current block is greater than a weighting value for a characteristic of a further block less close in time to the current block.

15. Apparatus of example 13 or 14, wherein the audio signal analyzer (120) is configured to determine the group of blocks so that the group of blocks comprises at least twenty blocks before the corresponding block or at least twenty blocks subsequent to the current block.

16. Apparatus of one of the preceding examples,
wherein the audio signal analyzer is configured to use a normalization value depending on a number of blocks in the group of blocks or depending on the weighting values for the blocks in the group of blocks.

17. Apparatus of one of the preceding examples,
further comprising a signal characteristic measurer (702, 704) for measuring a signal characteristic of at least one of the background component signals or the foreground component signals.

18. Apparatus of example 17,
wherein the signal characteristic measurer is configured to determine a foreground density (702) using the foreground component signal or to determine a foreground prominence (704) using the foreground component signal and the audio input signal.

19. Apparatus of one of the preceding examples,
wherein the foreground component signal comprises clap signals, wherein the apparatus further comprises a signal characteristic modifier for modifying the foreground component signal by increasing a number of claps or decreasing a number of claps or by applying a weight to the foreground component signal or the background component signal to modify an energy relation between the foreground clap signal and the background component signal being a noise-like signal.

20. Apparatus of one of the preceding examples,
further comprising a blind upmixer for upmixing the audio signal into a representation having a number of output channels being greater than a number of channels of the audio signal,
wherein the upmixer is configured to spatially distribute the foreground component signal into the output channels wherein the foreground component signal in the number of output channels are correlated, and to spectrally distribute the background component signal into the output channels, wherein the background component signals in the output channels are less correlated than the foreground component signals or are uncorrelated to each other.

21. Apparatus of one of the preceding examples,
further comprising an encoder stage (801, 802) for separately encoding the foreground component signal and the background component signal to obtain an encoded representation (804) of the foreground component signal and a separate encoded representation of the background component signal (806) for transmission or storage or decoding.

22. Method of decomposing an audio signal (100) into a background component signal (140) and a foreground component signal (150), the method comprising:
generating (110) a time sequence of blocks of audio signal values;
determining (120) a block characteristic of a current block of the audio signal and determining an average characteristic for a group of blocks, the group of blocks comprising at least two blocks; and
separating (130) the current block into a background portion and a foreground portion in response to a ratio of the block characteristic of the current block and the average characteristic of the group of blocks,
wherein the background component signal (140) comprises the background portion of the current block and the foreground component signal (150) comprises the foreground portion of the current block.

Subsequently, further examples are described that can be used separately from the above examples or in combination with any of the above examples.

1. Apparatus for decomposing an audio signal into a background component signal and a foreground component signal, the apparatus comprising:
a block generator (110) for generating a time sequence of blocks of audio signal values;
an audio signal analyzer (120) for determining a characteristic of a current block of the audio signal and for determining a variability of the characteristic within a group of blocks comprising at least two blocks of the sequence of blocks; and
a separator (130) for separating the current block into a background portion (140) and a foreground portion (150), wherein the separator (130) is configured to determine (182) a separation threshold based on the variability and to separate the current block into the background component signal (140) and the foreground component signal (150), when the characteristic of the current block is in a predetermined relation to the separation threshold, or to determine the whole current block as a foreground component signal, when the characteristic of the current block is in the predetermined relation to the separation threshold, or to determine the whole current block as a background component signal, when the characteristic of the current block is not in the predetermined relation to the separation threshold.

2. Apparatus of example 1,
wherein the separator (130) is configured to determine a first separation threshold (401) for a first variability (501) and a second separation threshold (402) for a second variability (502),
wherein the first separation threshold (401) is lower than the second separation threshold (402), and the first variability (501) is lower than the second variability (502) and wherein the predetermined relation is greater than, or
wherein the first separation threshold is greater than the second separation threshold, wherein the first variability is lower than the second variability, and wherein the predetermined relation is lower than.

3. Apparatus of example 1 or 2,
wherein the separator (130) is configured to determine the separation threshold using a table access or using a monotonic interpolation function interpolating between a first separation threshold (401) and a second separation threshold (402), so that, for a third variability (503), a third separation threshold (403) is obtained, and for a fourth variability (504), a fourth separation threshold (404) is obtained, wherein the first separation threshold (401) is associated with a first variability (501), and the second separation threshold (402) is associated with a second variability (502),
wherein the third variability (503) and the fourth variability are located, with respect to their values, between the first variability (501) and the second variability (502), and wherein the third separation threshold (403) and the fourth separation threshold (404) are located, with respect to their values, between the first separation threshold (401) and the second separation threshold (402).

4. Apparatus of example 3,
 wherein the monotonic interpolation function is a linear function or a quadratic function or a cubic function or a power function with an order greater than 3.
5. Apparatus of one of examples 1 to 4,
 wherein the separator (130) is configured to determine, based on the variability of the characteristic with respect to the current block, a raw separation threshold (405) and based on the variability of at least one preceding or following block, at least one further raw separation threshold (405), and to determine (407) the separation threshold for the current block by smoothing a sequence of raw separation thresholds, the sequence comprising the raw separation threshold and the at least one further raw separation threshold, or
 wherein a separator (130) is configured to determine a raw variability (402) of the characteristic for the current block and, additionally, to calculate (404) a raw variability for a preceding or a following block, and wherein the separator (130) is configured for smoothing a sequence of raw variabilities comprising the raw variability for the current block and the at least one further raw variability for the preceding or the following block to obtain a smoothed sequence of variabilities, and to determine separation thresholds based on smoothed variability of the current block.
6. Apparatus of one of the preceding examples,
 wherein the audio signal analyzer (120) is configured to determine the variability by calculating a characteristic of each block in the group of blocks to obtain a group of characteristics and by calculating a variance of the group of characteristics, wherein the variability corresponds to the variance or depends on the variance of the group of characteristics.
7. Apparatus of one of the preceding examples,
 wherein the audio signal analyzer (120) is configured to calculate the variability using an average or expected characteristic (502) and differences (504) between the characteristics in the group of characteristics and the average or expected characteristic, or
 by calculating the variability using differences (508) between characteristics of the group of characteristics following in time.
8. Apparatus of one of the preceding examples,
 wherein the audio signal analyzer (120) is configured to calculate the variability of the characteristic within the group of characteristics comprising at least two blocks preceding the current block or at least two blocks following the current block.
9. Apparatus of one of the preceding examples,
 wherein the audio signal analyzer (120) is configured to calculate the variability of the characteristic within the group of blocks consisting of at least thirty blocks.
10. Apparatus of one of the preceding examples,
 wherein the audio signal analyzer (120) is configured to calculate the characteristic as a ratio of a block characteristic of the current block and an average characteristic for a group of blocks comprising at least two blocks, and
 wherein the separator (130) is configured to compare the ratio to the separation threshold determined based on the variability of the ratio associated with the current block within the group of blocks.
11. Apparatus of example 10,
 wherein the audio signal analyzer (120) is configured to use, for the calculation of the average characteristic, and for the calculation of the variability, the same group of blocks.
12. Apparatus of one of the preceding examples, wherein the audio signal analyzer is configured for analyzing an amplitude-related measure as the characteristic of the current block and the amplitude-related characteristic as the average characteristic for the group of blocks.
13. Apparatus of one of the preceding examples,
 wherein the separator (130) is configured to calculate the separation gain from the characteristic, to weight the audio signal values of the current block using the separation gain to obtain the foreground portion of the current frame and to determine the background component so that the background signal constitutes a remaining signal, or
 wherein the separator is configured to calculate a separation gain from the characteristic, to weight the audio signal values of the current block using the separation gain to obtain the background portion of the current frame and to determine the foreground component so that the foreground component signal constitutes a remaining signal.
14. Apparatus of one of the preceding examples,
 wherein the separator (130) is configured to separate a following block following the current block in time using comparing the characteristic of the following block to a further release threshold,
 wherein the further release threshold is set such that a characteristic that is not in the predetermined relation to the threshold is in the predetermined relation to the further release threshold.
15. Apparatus of example 14,
 wherein the separator (130) is configured to determine the release threshold based on the variability and to separate the following block, when the characteristic of the current block is in a further predetermined relation to the release threshold.
16. Apparatus of example 14 or 15,
 wherein the predetermined relation is “greater than” and wherein the release threshold is lower than the separation threshold, or
 wherein the predetermined relation is “lower than” and wherein the release threshold is greater than the separation threshold.
17. Apparatus of one of the preceding examples,
 wherein the block generator (110) is configured to determine timely overlapping blocks of audio signal values or
 wherein the timely overlapping blocks have a number of sampling values being less than or equal to 600.
18. Apparatus of one of the preceding examples,
 wherein the block generator is configured to perform a block-wise conversion of the time domain audio signal into a frequency domain to obtain a spectral representation for each block,
 wherein the audio signal analyzer is configured to calculate the characteristic using the spectral representation of the current block, and
 wherein the separator (130) is configured to separate the spectral representation into the background portion and the foreground portion so that, for spectral bins of the background portion and the foreground portion corresponding to the same frequency, each have a spectral value different from zero, wherein a relation of the spectral value of the foreground portion and the spectral value of the background portion within the same frequency bin depends on the characteristic.

19. Apparatus of one of the preceding examples, wherein the audio signal analyzer (120) is configured to calculate the characteristic using the spectral representation of the current block to calculate the variability for the current block using the spectral representation of the group of blocks.

20. Method for decomposing an audio signal into a background component signal and a foreground component signal, the method comprising:
generating (110) a time sequence of blocks of audio signal values;
determining (120) a characteristic of a current block of the audio signal and determining a variability of the characteristic within a group of blocks comprising at least two blocks of the sequence of blocks; and
separating (130) the current block into a background portion (140) and a foreground portion (150), wherein a separation threshold is determined based on the variability and wherein the current block is separated into the background component signal (140) and the foreground component signal (150), when the characteristic of the current block is in a predetermined relation to the separation threshold, or wherein the whole current block is determined as a foreground component signal, when the characteristic of the current block is in the predetermined relation to the separation threshold, or wherein determine the whole current block is determined as a background component signal, when the characteristic of the current block is not in the predetermined relation to the separation threshold.

An inventively encoded audio signal can be stored on a digital storage medium or a non-transitory storage medium or can be transmitted on a transmission medium such as a wireless transmission medium or a wired transmission medium such as the Internet.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for decomposing an audio signal into a background component signal and a foreground component signal, the apparatus comprising:
a block generator for generating a time sequence of blocks of audio signal values of the audio signal, the time sequence of blocks comprising a current block of audio signal values and at least two blocks of audio signal values;
an audio signal analyzer configured for determining a characteristic of the current block of the time sequence of blocks, and configured for determining a variability of the characteristic within a group of blocks comprising the at least two blocks of the time sequence of blocks; and
a separator for separating the current block into a background portion and a foreground portion or to determine the whole current block as either the foreground component signal or the background component signal, wherein the separator is configured to:
determine a separation threshold based on the variability of the characteristic, and separate the current block into the background component signal and the foreground component signal, when the characteristic of the current block is in a predetermined relation to the separation threshold determined based on the variability of the characteristic, or determine the whole current block as the foreground component signal, when the characteristic of the current block is in the predetermined relation to the separation threshold determined based on the variability of the characteristic, or determine the whole current block as the background component signal, when the characteristic of the current block is not in the predetermined relation to the separation threshold determined based on the variability of the characteristic.

2. The apparatus of claim 1, wherein:

the separator is configured to determine a first value of the separation threshold for a first value of the variability of the characteristic and a second value of the separation threshold for a second value of the variability of the characteristic, the first value of the separation threshold is lower than the second value of the separation threshold, the first value of the variability of the characteristic is lower than the second value of the variability of the characteristic, and the predetermined relation to the separation threshold is greater than the separation threshold, or the first value of the separation threshold is greater than the second value of the separation threshold, the first value of the variability is lower than the second value of the variability, and the predetermined relation to the separation threshold is lower than the separation threshold.

3. The apparatus of claim 1, wherein the audio signal analyzer is configured to calculate the variability of the characteristic within the group of blocks, wherein the group of blocks comprises, as the at least two blocks, at least two blocks preceding the current block in the time sequence of blocks or at least two blocks following the current block in the time sequence of blocks.

4. The apparatus of claim 1, wherein the audio signal analyzer is configured to calculate the characteristic using a spectral representation of the current block to calculate the variability for the current block using a spectral representation of the group of blocks.

5. A method of decomposing an audio signal into a background component signal and a foreground component signal, the method comprising:

generating a time sequence of blocks of audio signal values of the audio signal, the time sequence of blocks comprising a current block of audio signal values and at least two blocks of audio signal values;

determining a characteristic of the current block of the time sequence of blocks and determining a variability of the characteristic within a group of blocks comprising the at least two blocks of the time sequence of blocks; and separating the current block into a background portion and a foreground portion or determining the whole current block as either the foreground component signal or the background component signal, wherein a separation threshold is determined based on the variability of the characteristic, and wherein the current block is separated into the background component signal and the foreground component signal, when the characteristic of the current block is in a predetermined relation to the separation threshold determined based on the variability of the characteristic, or wherein the whole current block is determined as the foreground component signal, when the characteristic of the current block is in the predetermined relation to the separation threshold determined based on the variability of the characteristic, or wherein the whole current block is determined as the background component signal, when the characteristic of the current block is not in the predetermined relation to the separation threshold determined based on the variability of the characteristic.

6. A non-transitory digital storage medium having stored thereon a computer program for performing, when said computer program is run by a computer, a method of decomposing an audio signal into a background component signal and a foreground component signal, the method comprising:

generating a time sequence of blocks of audio signal values of the audio signal, the time sequence of blocks comprising a current block of audio signal values and at least two blocks of audio signal values;

determining a characteristic of the current block of the of the time sequence of blocks and determining a variability of the characteristic within a group of blocks comprising the at least two blocks of the time sequence of blocks; and separating the current block into a background portion and a foreground portion or determining the whole current block as either the foreground component signal or the background component signal, wherein a separation threshold is determined based on the variability of the characteristic, and wherein the current block is separated into the background component signal and the foreground component signal, when the characteristic of the current block is in a predetermined relation to the separation threshold determined based on the variability of the characteristic, or wherein the whole current block is determined as the foreground component signal, when the characteristic of the current block is in the predetermined relation to the separation threshold determined based on the variability of the characteristic, or wherein the whole current block is determined as the background component signal, when the characteristic of the current block is not in the predetermined relation to the separation threshold determined based on the variability of the characteristic.

* * * * *